(12) United States Patent
Kamemizu et al.

(10) Patent No.: US 7,219,939 B2
(45) Date of Patent: May 22, 2007

(54) LOCK RELEASE OPERATOR LAYOUT STRUCTURE IN VEHICLE

(75) Inventors: Fuminori Kamemizu, Saitama (JP); Kengo Yano, Saitama (JP); Nobuo Yamaguchi, Saitama (JP); Kazuhiko Mori, Saitama (JP); Noriyuki Matsui, Saitama (JP); Atsushi Hatayama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 144 days.

(21) Appl. No.: 11/037,194

(22) Filed: Jan. 19, 2005

(65) Prior Publication Data

US 2005/0156000 A1  Jul. 21, 2005

(30) Foreign Application Priority Data

Jan. 20, 2004 (JP) ............................. 2004-012503
Jan. 20, 2004 (JP) ............................. 2004-012504

(51) Int. Cl.
*B60R 5/00* (2006.01)

(52) U.S. Cl. ..................................... 296/37.1; 224/413

(58) Field of Classification Search .............. 296/37.1, 296/37.13, 37.15, 37.16; 297/188.09, 188.1, 297/243, 440.22; 224/413; 180/219
See application file for complete search history.

(56) References Cited

U.S. PATENT DOCUMENTS

| 4,907,428 A | 3/1990 | Nakashima et al. |
| 5,533,783 A | 7/1996 | Harms et al. |
| 5,887,596 A | 3/1999 | Ziegler et al. |
| 6,623,071 B2 * | 9/2003 | Kawamoto et al. .... 297/188.09 |
| 2003/0222473 A1 | 12/2003 | Yamamoto et al. |

FOREIGN PATENT DOCUMENTS

| DE | 199 06 052 A1 | 8/2000 |
| JP | 2001-260968 A | 9/2001 |
| JP | 2003-285692 A | 10/2003 |

* cited by examiner

*Primary Examiner*—Lori L. Lyjak
(74) *Attorney, Agent, or Firm*—Birch, Stewart, Kolasch & Birch, LLP

(57) ABSTRACT

In a vehicle including a plurality of containing portions, namely, a front containing portion provided in an inner cover covering from the rear side a head pipe of a vehicle body frame at its front end and constituting a part of a vehicle body cover which can be locked in a fully closed condition, to facilitate the operation for releasing the lock conditions of the plurality of containing portions. A plurality of lock release operating buttons for respectively releasing the locked conditions of a plurality of containing portions inclusive of a front containing portion is disposed at an inner cover on a lateral side of the front containing portion.

21 Claims, 23 Drawing Sheets

LOCK RELEASE OPERATOR LAYOUT STRUCTURE IN VEHICLE

CROSS-REFERENCE TO RELATED APPLICATIONS

The present application is related to Japanese Patent Application Nos. 2004-012504 and 2004-012503 both filed on Jan. 20, 2004 the entire contents of which are hereby incorporated by reference.

BACKGROUND OF THE INVENTION

1. Field of the Invention

The present invention relates to a vehicle including a plurality of containing portions which include a front containing portion provided in an inner cover covering from the rear side a head pipe with a vehicle body frame at its front end and including a part of a vehicle body cover which can be locked in a fully closed condition. More particularly to a layout structure for a plurality of lock release operators for respectively releasing the lock conditions of the plurality of containing portions.

The present invention also relates to a containing structure for a vehicle, including an inner cover for covering from the rear side a head pipe of a vehicle body frame at its front end and which constitutes a part of a vehicle body cover, and a containing case mounted to the inner cover in an openable and closable condition.

2. Description of Background Art

A motor scooter type motorcycle wherein an inner cover includes a part of a vehicle body cover for covering a head pipe from the rear side that is provided with a containing portion is known, for example, in Japanese Patent Laid-open No. 2003-285692.

In addition to the containing portion provided in the above-mentioned inner cover, a motorcycle generally includes other containing portion(s) such as, for example, a containing portion provided on the lower side of a rider's seat, and, in the conventional motorcycles, operating portions for releasing the lock conditions of the plurality of containing portions that are individually disposed respectively in the vicinity of the relevant containing portions. However, there are some cases where it is desired to release the lock conditions of the plurality of containing portions. In such cases, since the operating portions for releasing the lock conditions are apart from each other in the conventional motorcycle, the unlocking, lock releasing, operation is intricate to carry out.

A structure wherein a containing case with its rear end along the vehicle body front-rear direction that can be opened is mounted to an inner cover constituting a part of a vehicle body cover for covering a head pipe from the rear side and in which a cover member is capable of closing a rear end opening portion of the containing case and mounted to the inner cover so as to be turnable between a full closure position and a full opening position is disclosed in Japanese Patent Laid-open No. 2001-260968.

SUMMARY AND OBJECTS OF THE INVENTION

The present invention has been made in consideration of the above circumstances. It is an object of the invention to provide a lock release operator layout structure in a vehicle by which an operation for releasing the lock conditions of a plurality of containing portions is facilitated.

In order to attain the above object, the present invention sets forth a lock release operator layout structure in a vehicle including containing portions which include a front containing portion provided in an inner cover covering from the rear side a head pipe of a vehicle body frame at its front end and constituting a part of a vehicle body cover and which can be locked in a fully closed condition wherein the lock release operators for releasing the lock conditions of the containing portions are disposed at the inner cover on a lateral side of the front containing portion.

The lock release operators correspond to lock release operating buttons 248a, 249a in an embodiment of the present invention which will be described later.

In addition, the present invention provides the lock release operators that are disposed at positions set off to either the left or right side from the vehicle body center line.

The present invention includes a plurality of the lock release operators formed to be horizontally elongate that are arranged in a vertically aligned pattern.

Further, the present invention provides the lock release operator for releasing the lock condition of the front containing portion, a case lock mechanism possessed by the front containing portion, and an electric actuator for exerting an unlocking force on the case lock mechanism that are disposed at substantially the same height.

The present invention includes a plurality of the lock releasing operators that are arranged in a vertically aligned pattern.

According to the present invention, since the plurality of lock release operators for respectively releasing the lock conditions of the plurality of containing portions inclusive of the front containing portion are concentratedly disposed on a lateral side of the front containing portion, the operation for releasing the lock conditions of the plurality of containing portions is facilitated.

According to the present invention, the unlocking, lock releasing, operation by the rider on the rider's seat is further facilitated.

According to the present invention, the plurality of lock release operators can be disposed in a compact form so that the space in the vertical direction occupied by the lock release operators will not be large.

According to the present invention, the wiring between the lock release operator for releasing the lock condition of the front containing portion as well as the power transmission system between the electric actuator and the case lock mechanism can be configured in a compact form.

According to the present invention, the plurality of lock release operators can be so arranged that the space in the horizontal direction occupied by the lock release operations is narrowed.

In addition, the above-mentioned structure according to the related art has a problem in that the cover member can be located only in either one of the fully closed position and the full opened position. Therefore, the containing case cannot be used in correspondence with various use conditions.

The present invention has been made in consideration of the foregoing circumstances. It is an object of the present invention to provide a containing structure for a vehicle which makes it possible for a containing case to be used in correspondence with various use conditions.

In order attain the above object, the present invention resides in a containing structure for a vehicle, including an inner cover for covering from the rear side a head pipe of a vehicle body frame at its front end and which constitutes a part of a vehicle body cover. A containing case is mounted to the inner cover in an openable and closable condition. A holding mechanism for temporarily holding the containing case at an intermediate position between a fully closed position and a fully opened position of the containing case when the containing case is opened from the fully closed position is provided between the containing case and the inner cover so that its hold condition can be released.

The present invention provides a holding mechanism that is capable of temporarily holding the containing case at a roughly central position between the fully closed position and the fully opened position.

The present invention provides a containing case that is mounted to the inner cover so as to be slidable in the vehicle front-rear direction between the fully closed position where the containing case is contained in the inner cover and the fully opened position where the containing case projects from the inner cover. A hold release operating member for releasing the hold condition of the holding mechanism is disposed at a lower surface of the containing case at a position near the vehicle body center line side and the vehicle body rear side.

The present invention includes a case lock mechanism for locking the containing case in the fully closed position according to the sliding of the containing case towards the closing side to the fully closed position and for releasing the lock condition according to the action of an unlocking force is provided between a support frame fixed to the inner cover and the containing case, and spring means for spring biasing the containing case in the fully closed position toward the opening side is provided.

According to the present invention, it is possible for momentarily holding the containing case at an intermediate position between the fully closed position and the fully opened position. Therefore, the containing cases can be used in correspondence with various use conditions.

According to the present invention, things appropriate in size can be put into and taken out of the containing case while holding the containing case in the state of being opened to an appropriate degree.

According to the present invention, the hold release operating member can be arranged at such a position wherein it can be easily operated at the time of releasing the condition where the containing case is temporarily held by the holding mechanism.

Furthermore, according to the present invention, when an unlocking force is exerted to put the case lock mechanism into an unlocking operation, the containing case is slid from the fully closed position towards the opening side by the spring biasing force of the spring means, so that a part of the containing case projects from the inner cover. Therefore, it can easily be confirmed visually by the rider that the case lock mechanism has been put into the unlock condition. Moreover, the containing case can be drawn out with a small operating force.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Now, a mode for carrying out the present invention will be described below, based on one embodiment of the present invention shown in the accompanying drawings.

Figure 1:
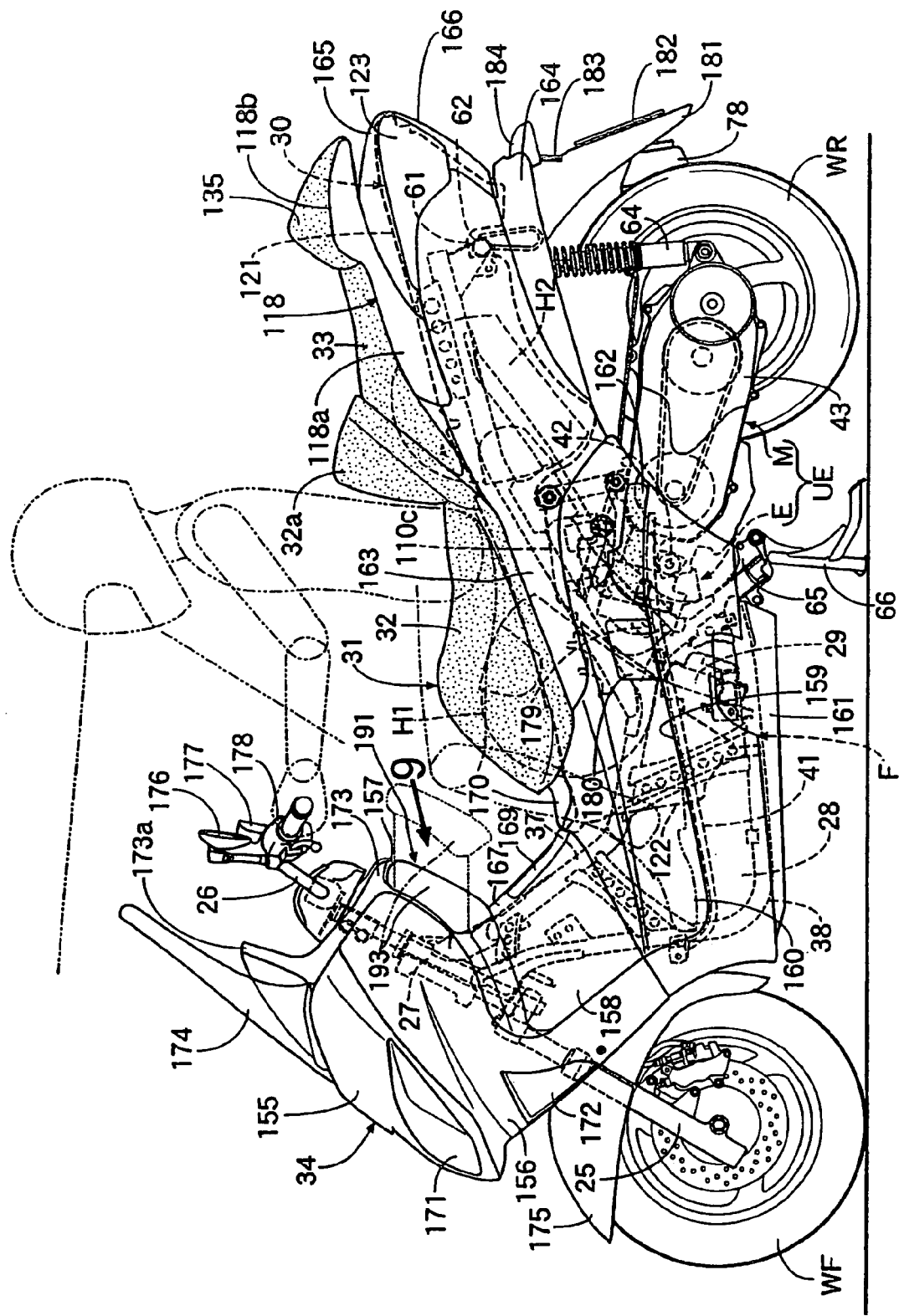
FIG. 1 is a left side view of a motor scooter type motorcycle.

As illustrated in FIG. 1, a vehicle body frame F of a motor scooter type vehicle includes, at the front end thereof, a front fork 25 for rotatably supporting a front wheel WF, and a head pipe 27 for steerably supporting a steering handle 26 connected to the front fork 25. A unit swing engine UE for supporting a rear wheel WR at the rear end thereof is vertically swingably supported on an intermediate portion in the front-rear direction of the vehicle body frame F. On the front side relative to the unit swing engine UE, a fuel tank 28 is a functional component part formed to be vertically elongated in a side view with a radiator 29 disposed on the rear side relative to the fuel tank 28 and mounted on the vehicle body frame F. In addition, a rider's seat 31, configured in a tandem form having a front seat 32 and a rear seat 33, is disposed at a rear portion of the vehicle body frame F. Further, a synthetic resin-made vehicle body cover 34 for covering the vehicle body frame F, a front portion of the unit swing engine UE, the fuel tank 28 and the radiator 29 is mounted on the vehicle body frame F.

Figure 2:
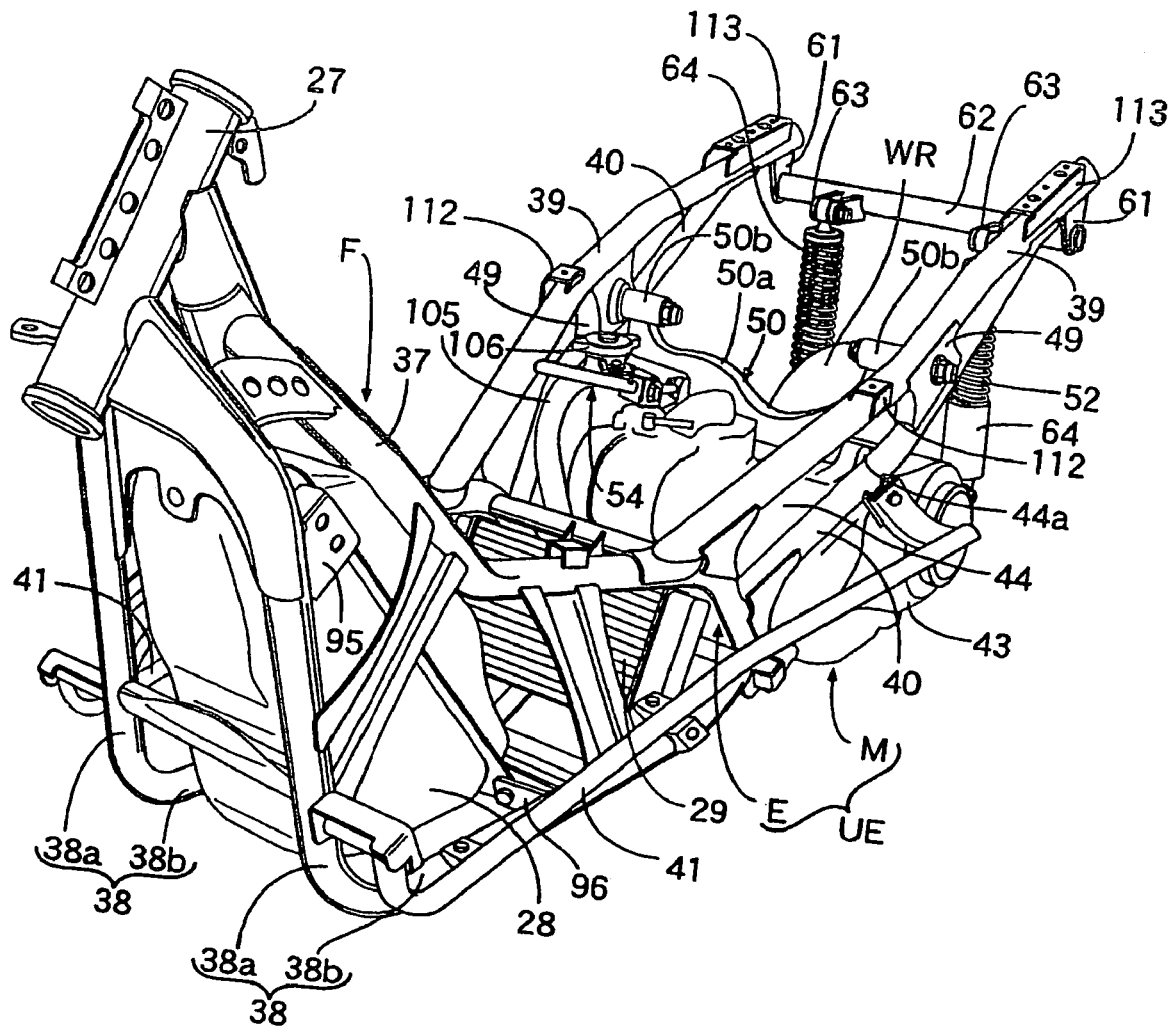
FIG. 2 is a perspective view of a vehicle body frame in the condition where a fuel tank and a radiator are mounted.
Figure 3:
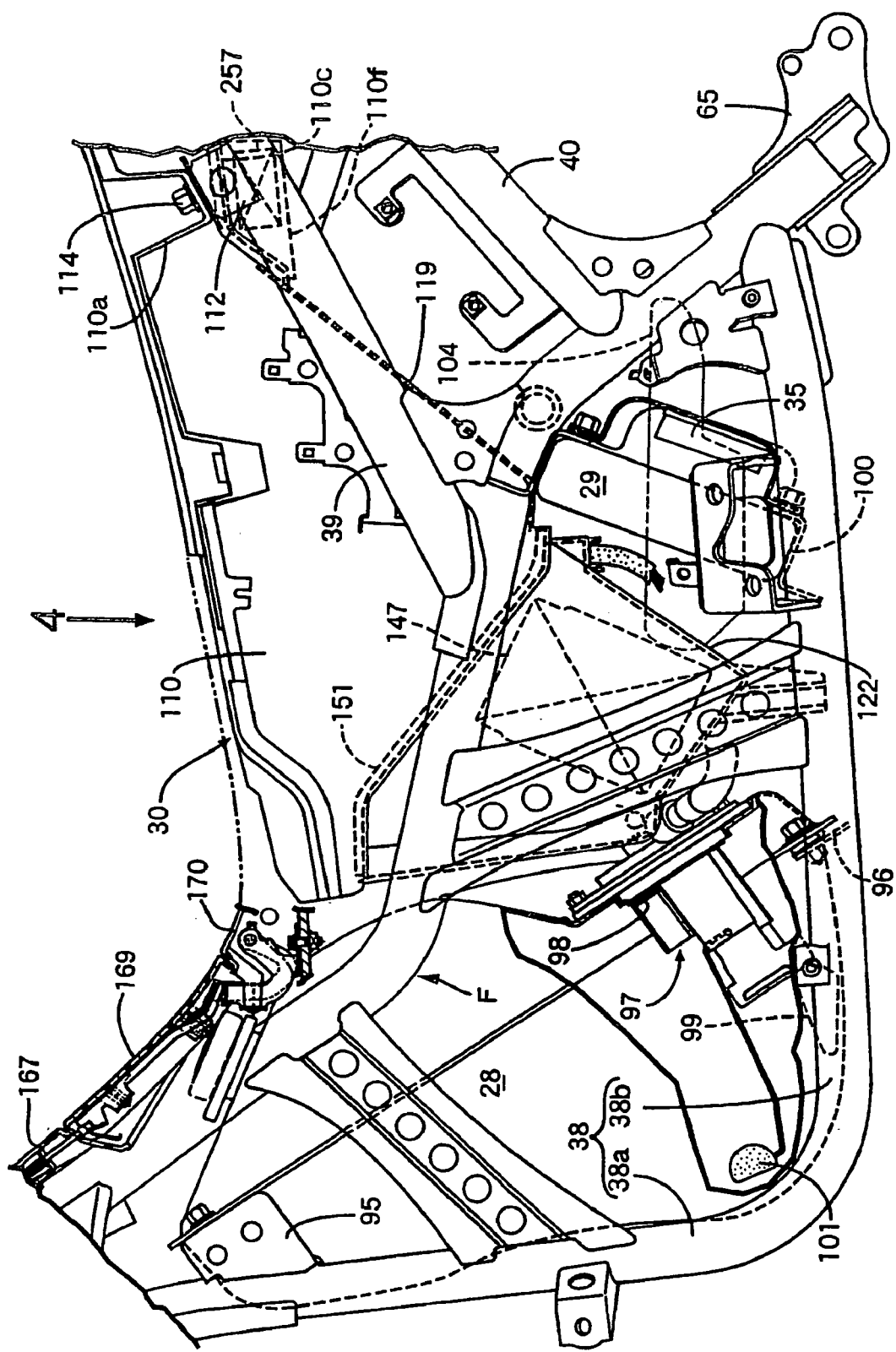
FIG. 3 is a left side view of an intermediate portion in the front-rear direction of the motor scooter type motorcycle in the condition where a rider's seat and a vehicle body cover are removed.

Referring to FIGS. 2 and 3, the vehicle body frame F includes the head pipe 27; a left-right pair of upper down frames 37 . . . connected to the head pipe 27 and extending rearwardly and downwardly with a left-right pair of lower down frames 38, 38 of which horizontal portions 38b . . . are integrally connected to the rear ends of inclined portions 38a . . . connected to the head pipe 27 on the lower side relative to the upper down frames 37 . . . and extending rearwardly and downwardly and of which the rear ends are welded to rear end portions of the upper down frames 37 . . . . A left-right pair of seat rails 39, 39 extend rearwardly and upwardly from intermediate portions of both the upper down frames 37 . . . with a left-right pair of rear frames 40, 40 for connection between rear portions of the upper down frames 37 . . . and rear portions of the seat rails 39 . . . ; and a left-right pair of support frames 41, 41 disposed on the outer sides of the lower down frames 38 . . . and the rear frames 40 . . . and extending in the front-rear direction.

Both the support frames 41 . . . support, from the lower side, step floors 159 . . . possessed by the vehicle body cover 34 at left and right positions, the front ends of both the support frames 41 . . . are connected to lower portions of the inclined portions 38a . . . of the lower down frames 38 . . . , and the rear ends of both the support frames 41 . . . are connected to intermediate portions of the rear frames 40 . . . .

Figure 4:
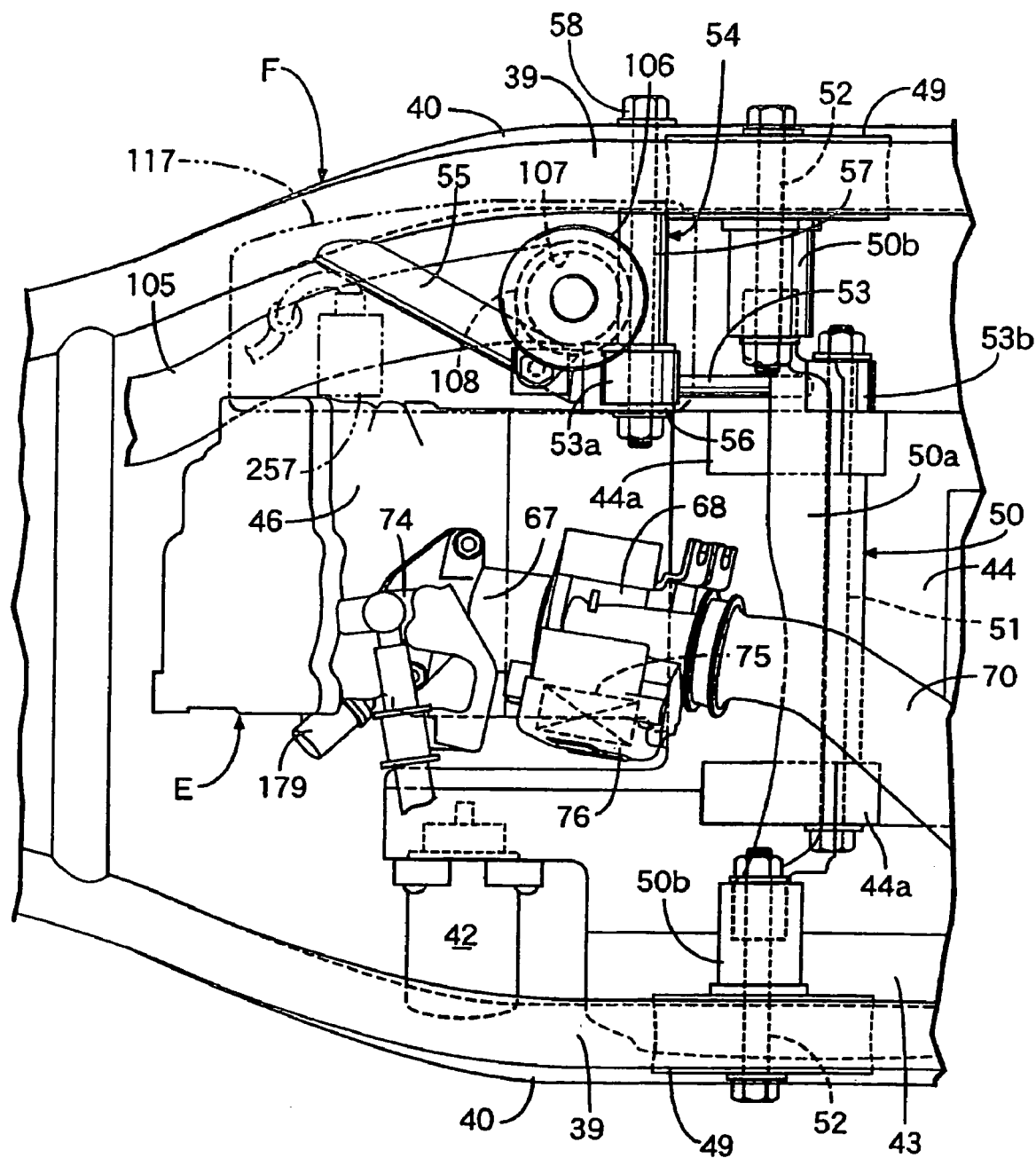
FIG. 4 is a view along arrow 4 of FIG. 3 in the condition where a luggage box is removed.
Figure 5:
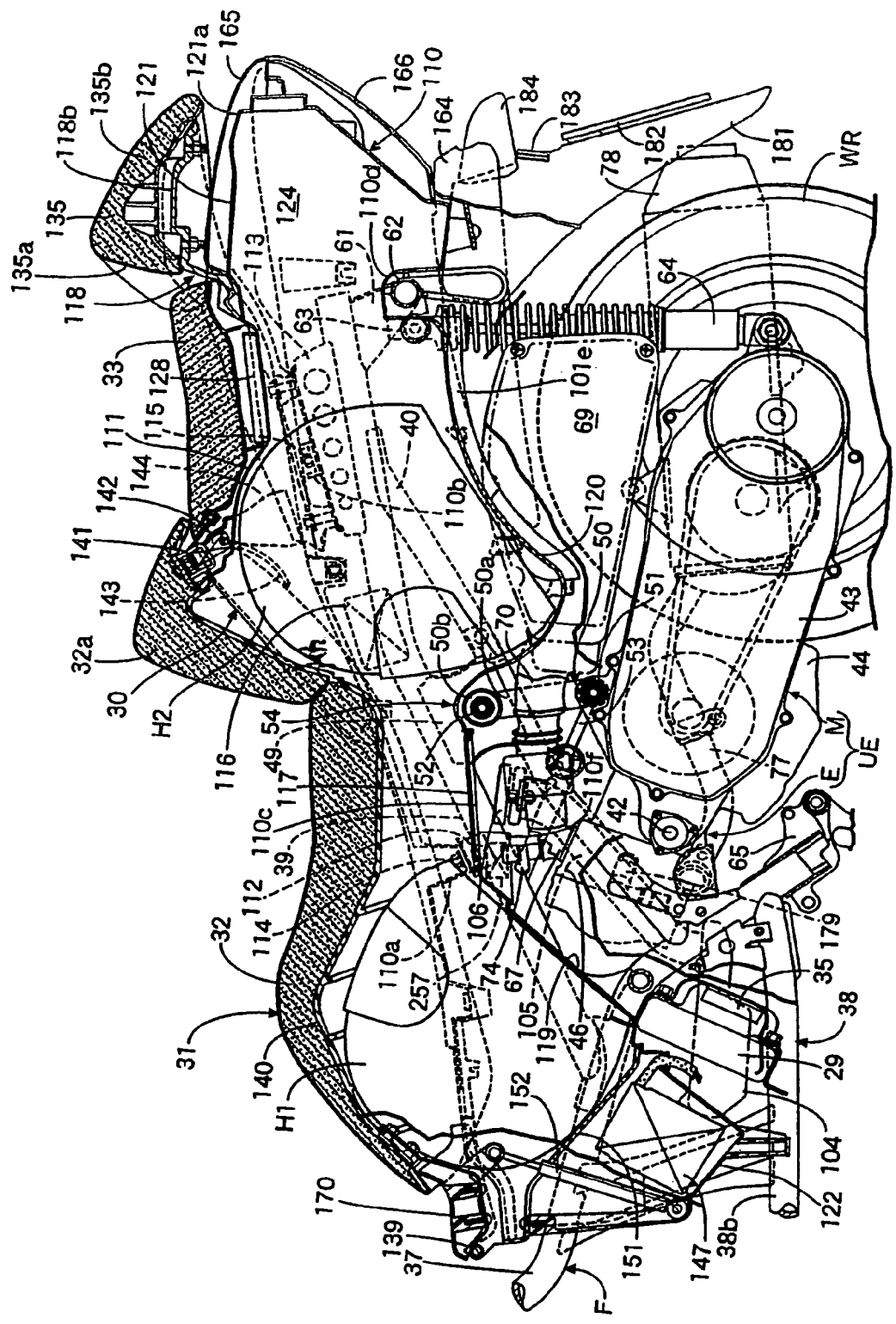
FIG. 5 is an enlarged vertically sectional side view of a rear portion of the motor scooter type motorcycle.

Referring to FIGS. 4 and 5 also, the unit swing engine UE is composed of a water-cooled type engine E having a cylinder axis set substantially horizontal, and a belt-type continuously variable transmission M for transmitting the output of the engine E to the rear wheel WR through non-stage (stepless) speed change by a transmission belt and pulleys. The continuously variable transmission M is so configured so as to steplessly vary the speed change ratio by driving a movable pulley on the crankshaft side according to the operation of a speed change electric motor 42.

A transmission case 43 of the continuously variable transmission M is provided in connection with the left side of a crankcase 44 of the engine E so as to bulge from the engine E to the left side, and extends to the left side of the rear wheel WR. In addition, a front end portion of a swing arm (not shown) is connected to the right side of the crankcase 44, and the rear wheel WR is rotatably supported between a rear end portion of the transmission case 43 and a rear end portion of the swing arm.

Brackets 49, 49 are provided between intermediate portions of the seat rails 39 . . . and the rear frames 40 . . . in the vehicle body frame F, and a pair of support projecting portions 44a, 44a are provided on the upper surface of the crankcase 44 of the engine E. A link 50 includes a link tube portion 50a extending in the vehicle body width direction, and hollow cylindrical support tube portions 50b, 50b provided coaxially and integrally at both ends of the link tube portion 50a with both the support projecting portions 44a, 44a and the link tube portion 50a being connected by a connecting shaft 51. In addition, the support tube portions 50b, 50b at both ends of the link 50 are turnably supported on the bracket 49, 49 through support shafts 52, 52 parallel to the connecting shaft 51. In other words, the unit swing engine UE is supported on the vehicle body frame F so as to be swingable about the axis of both the support shafts 52, 52.

Meanwhile, a tension rod 53 is provided between the engine E and the vehicle body frame F, and ring-like connection portions 53a, 53b are provided at both ends of the tension rod 53. The connection portion 53a at one end of the tension rod 53 is turnably connected to a mount portion 54 provided in the seat rail 39 and the rear frame 40 on the right side, of the vehicle body frame F, and the connection portion 53b at the other end of the tension rod 53 is turnably connected to the right end of the connecting shaft 51 connecting the crankcase 44 to the link 50.

The mount portion 54 includes a support tube 55 extending rearwardly and downwardly from a front portion of the seat rail 39 on the right side with a bracket 56 being in a roughly U-shape opened toward the rear side and attached to the rear end of the support tube 55, and a connecting tube 57 for connection between the rear frame 40 on the right side and the bracket 56. The connection portion 53a at one end of the tension rod 53 is turnably supported on the mount portion 54 by a bolt 58 fixed to the vehicle body frame F in the state of being passed through the bracket 56 and the connecting tube 57.

In addition, downwardly drooping support plates 61, 61 are attached to the rear ends of both the seat rails 39 . . . in the vehicle body frame F with upper end portions of shock absorbers 64, 64 being connected to a pair of brackets 63, 63 provided on a support pipe 62 bridgingly provided between both the support plates 61, 61. The lower end portions of both the shock absorbers 64, 64 are connected to a rear end portion of the transmission case 43 and a rear end portion of the swing arm.

Brackets 65 . . . are attached to the rear ends, or the lower ends, of both the upper down frames 37 . . . with a main stand 66 being turnably supported by both the brackets 65 . . . . When the main stand 66 is erected, the motor scooter type motorcycle can be made to self-stand with the rear wheel WR off the ground as shown in FIG. 1, and the main stand 66 is stowed so that the rear wheel WR makes contact with the ground at the time of operating the motorcycle.

The downstream end of a throttle body 68 is connected to the upper surface of a cylinder head 46 in the engine E through an intake pipe 67 curved toward the rear side from the cylinder head 46, and the upstream end of the throttle body 68 is connected to an air cleaner 69 disposed on the upper side of the continuously variable transmission M in the unit swing engine UE, through a connecting pipe 70 passing on the upper side of the link tube portion 50a of the link 50.

A fuel injection valve 74 is attached to the intake pipe 67. In addition, a control box 76 containing a controller for controlling the ignition timing of the engine E and the fuel injection amount of the fuel injection valve 74 is attached to the throttle body 68.

An exhaust pipe 77 is connected to the lower surface of the cylinder head 46, and the exhaust pipe 77 is connected to an exhaust muffler 78 disposed on the right side of the swing arm.

The fuel injection valve 74 for injecting fuel toward the engine E is supplied with fuel from the fuel tank 28. The fuel tank 28 is disposed in a space surrounded by the left-right pair of upper down frames 37 . . . and the left-right pair of lower down frames 38 . . . in the vehicle body frame F and located immediately on the rear side of the front wheel WR, and is formed to vertically extend over the range from the rear side of a lower portion of the head pipe 27 to lower portions of both the lower down frames 38 . . . .

Mount plates 95 . . . for fastening an upper portion of the fuel tank 28 are welded to the inclined portions 38a . . . of both the lower down frames 38 . . . with mount plates 96 . . . for fastening a lower portion of the fuel tank 28 being welded to the horizontal portions 38b . . . of both the lower down frames 38 . . . .

A pump unit 97 is contained in a lower portion of the inside of the fuel tank 28. The pump unit 97 is mounted to the fuel tank 28 from the back side of the fuel tank 28 in such a manner so as to be inserted into the fuel tank 28 through a mount hole 98 provided in the back surface of a lower portion of the fuel tank 28.

In addition, the pump unit 97 is mounted to the fuel tank 28 with its rotational axis inclined forwardly and downwardly with a fuel filter 99 annexed to the pump unit 97 so as to suck in the fuel present in the fuel tank 28 being disposed at a lowermost portion of the inside of the fuel tank 28. In addition, a float 101 that is moved up and down according to the amount of the fuel in the fuel tank 28 extends from the pump unit 97, and the residual fuel amount detected by the float 101 is sent to the controller 75 in the control box 76 attached to the throttle body 68.

The radiator 29 includes a radiator fan 35 disposed at a position spaced rearwardly from the fuel tank 28. The radiator 29 is supported by a support frame 100, which is provided between rear portions of the horizontal portions 38b . . . of both the lower down frames 38 in the vehicle body frame F and rear portions of both upper down frames 37 . . . in the vehicle body frame F.

The lower end of a hose 105 extends upwardly and is connected to a reservoir tank 104 connected to the radiator 29 with the upper end of the hose 105 being connected to a water supply port forming member 108 forming a water supply port 107 which can be opened and closed with a cap 106.

In addition, the water supply port forming member 108 is supported by the mount portion 54, for mounting to the vehicle body frame F side, of the tension rod 53 provided between the vehicle body frame F and the unit swing engine UE swingably supported on the vehicle body frame F. In other words, the water supply port forming member 108 is supported on the support tube 55 extending rearwardly and downwardly from a front portion of the seat rail 39 on the right side and constituting a part of the mount portion 54.

Figure 6:
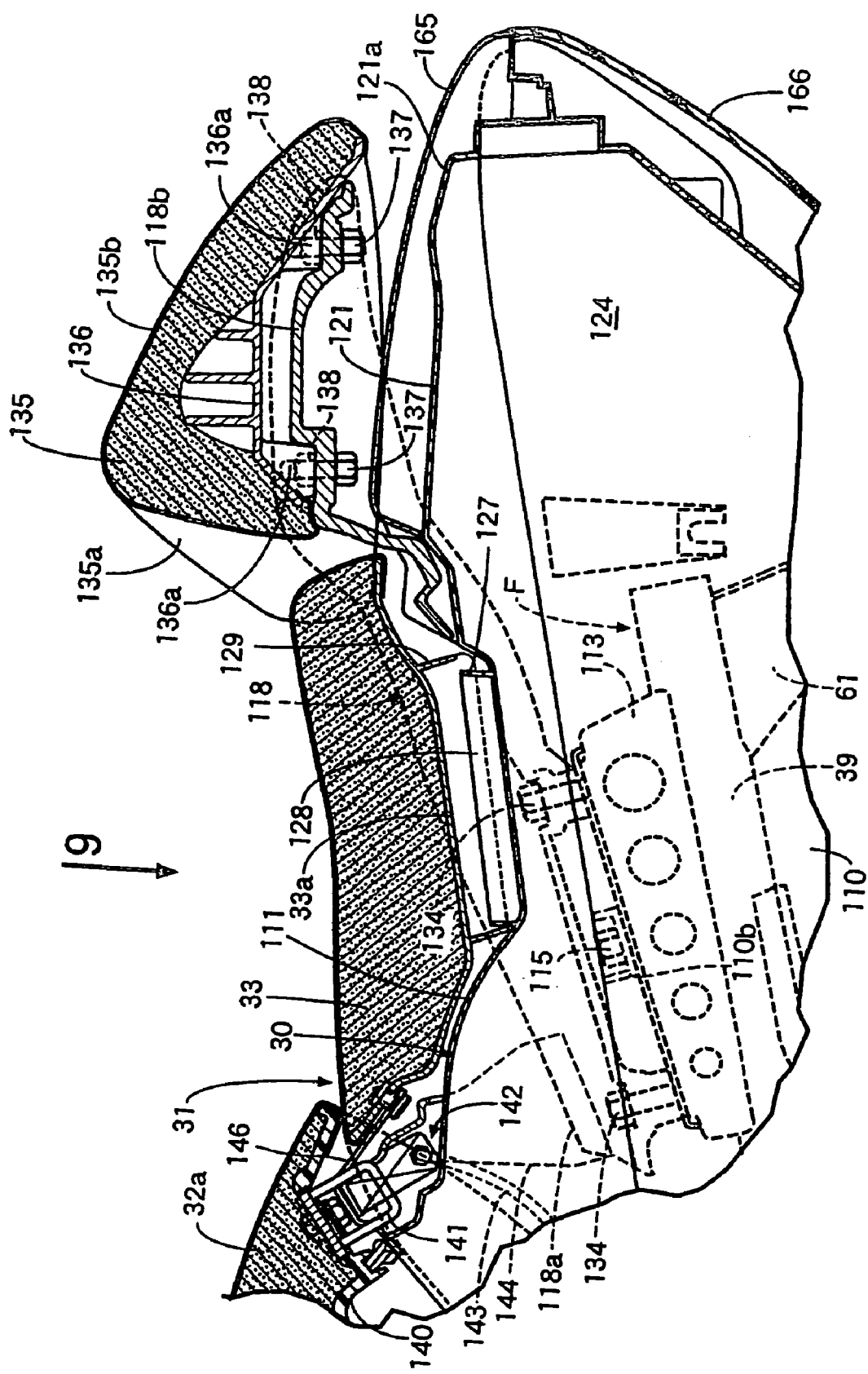
FIG. 6 is a vertical sectional view of the surroundings of a rear portion of the luggage box.

Referring to FIG. 6 also, the luggage box 30 as a luggage containing portion is disposed between rear portions of both the upper down frames 37 . . . in the vehicle body frame F, between both the seat rails 39 . . . , between both the rear frames 40 . . . and on the lower side of the rider's seat 31. The luggage box 30 includes a box main body 110 opened at the top end with a top cover 111 connected to the box main body 110 so as to cover a rear portion of the box main body 110 from the upper side. The luggage box 30 is disposed so as to extend from the lower side of the front end of the rider's seat 31 to the vicinity of upper portions of the rear shock absorbers 64 . . . .

For supporting the luggage box 30 on the vehicle body frame F, front support members 112 . . . are welded respectively to intermediate portions of the pair of seat rails 39 . . . in the vehicle body frame F, and rear support members 113 . . . elongate in the front-rear direction are welded respectively to rear portions of both the seat rails 39 . . . . On the other hand, front mount portions 110a . . . mounted on the front support members 112 . . . and rear mount portions 110b . . . mounted on intermediate portions in the longitudinal direction of the rear support portions 113 . . . are provided at both side upper portions of the box main body 110 of the luggage box 30. The front mount portions 110a . . . are respectively fastened to the front support members 112 . . . by bolts 114 . . . , and the rear mount portions 110b . . . are respectively fastened to the rear support members 113 . . . by bolts 115 . . . .

The bottom wall of the luggage box 30, i.e., the bottom wall of the box main body 110 is provided with a front helmet containing portion 119 disposed on the lower side of the front seat 32 so as to be capable of containing a helmet H1 therein. A rear helmet containing portion 120 is disposed on the lower side of the rear seat 33 so as to be capable of containing a helmet H2 therein. A substantially flat shallow portion 110c is disposed between the front helmet containing portion 119 and the rear helmet containing portion 120. The front and rear helmet containing portions 119, 120 are each formed in a downwardly bulging shape. In addition, the front edge of the top cover 111 of the luggage box 30 is formed in an arcuate shape bulging rearwardly in a top plan view for permitting the helmet H2 to be contained in the rear helmet containing portion 120. An illumination means 116 for illuminating the inside of the luggage box 30 is attached to the inside surface of the box main body 110, at a portion corresponding to a front portion of the top cover 111.

On the lower side of the shallow portion 110c of the luggage box 30, the throttle body 68 and the fuel injection valve 74 are disposed, with their upper end positions being substantially the same. The water supply port 107 of the reservoir tank 104 is disposed adjacent thereto. A first maintenance lid 117 is openably and closably attached to the shallow portion 110c on the upper side of the water support port 107.

A rear bulging portion 121 bulging to the rear side relative to the support pipe 62, which is the mount portion for mounting upper portions of the shock absorber 64 . . . to a rear portion of the vehicle body frame F, and the rear end of the rear seat 33 is provided at a rear portion of the luggage box 30. The rear bulging portion 121 bulges rearwardly to substantially the same position as the rear end of a grab rail 118 disposed around the rear seat 33. In addition, a small width portion 121a is provided at the center of a rear portion of the rear bulging portion 121, and tail light units 123 . . . are provided on both sides of the small width portion 121a.

A lower portion of the rear bulging portion 121 is disposed on the lower side relative to the support pipe 62, which is the mount portion for mounting upper portions of the rear shock absorbers 64 . . . to a rear portion of the vehicle body frame F. Thus, a raised portion 110d corresponding to the mount portion for mounting the upper portions of the rear shock absorbers 64 to the vehicle body frame F is formed in a manner of partly raising the bottom wall of the luggage box 30, i.e., the bottom wall of the box main body 110. A containing portion 124 with the raised portion 110d between itself and the rear helmet containing portion 120 is formed in the rear bulging portion 121.

The rear seat 33 of the rider's seat 31 is formed so as to cover the front portion side of the top cover 111 of the luggage box 30, and is detachably attached to the top cover 111. The upper surface of the top cover 111 is provided with a tetragonal first rib 127 connected endlessly, and a containing space 128 which can be utilized according to the attachment and detachment of the rear seat 33 that is formed on the upper surface of the top cover 111 so as to be surrounded by the first rib 127. In addition, a second rib 129 is connected endlessly while surrounding the first rib 127 and droops from a bottom plate 33a of the rear seat 33. A labyrinth structure surrounding the containing space 128 includes the first and second ribs 127, 129.

The grab rail 118 is a metallic member integrally including grip portions 118a . . . disposed on both sides of the rear seat 33 and extending in the front-rear direction with a connection portion 118b for connection between the rear ends of the grip portions 118a . . . . Front portions of both the grip portions 118a are respectively fastened to the rear support members 113 . . . welded to rear portions of the seat rails 39 . . . in the vehicle body frame F, by bolts 134 . . . at two positions (each) on the front and rear sides of fastening portions for fastening the luggage box 30 to the rear support members 113 . . . .

The connection portion 118 is integrally connected to the rear ends of both the grip portions 118a . . . so as to be located at a position spaced upwardly from an upper portion of the rear bulging portion 121 of the luggage box 30 and to be at substantially the same height as the upper surface of the rear seat 33. A backrest 135 for holding, from the rear side, a waist portion of the passenger seated on the rear seat 33 is detachably attached to the connection portion 118b.

Specifically, a bottom plate 136 of the backrest 135 is integrally provided with a plurality of leg portions 136a . . . which abut on the connection portion 118b of the grab rail 118. Nuts 138 . . . are embedded in the leg portions 136a . . . , and bolts 137 . . . passed through the connection portion 118b of the grab rail 118 from the lower side are screw-engaged and fastened with the nuts 138 . . . , whereby the backrest 135 is detachably attached to the upper surface of a rear portion of the grab rail 118, i.e., the upper surface of the connection portion 118b.

In addition, the backrest 135 is formed in a roughly streamline shape provided at its upper surface with a forwardly lowered front inclined surface 135a and a rearwardly lowered inclined surface 135b in side view, and is formed to become narrower in width toward the rear side in a top plan view. In the top plan view, the grab rail 118 and the backrest 135 overlap each other at substantially the entire part thereof.

The front seat 32 of the rider's seat 31 is integrally provided at its rear portion with a backrest portion 32a raised upwardly so as to hold, from the rear side, a waist portion of the driver seated on the front seat, and is disposed on the luggage box 30 so as to cover, from the upper side, the front opening portion, not covered with the top cover 111, of the luggage box 30. A front end portion of the front seat 32 is connected to the front end of the luggage box 30 through a hinge pin 139. Namely, the front end portion of the front seat 32 is turnably supported on the luggage box 30 so as to be vertically openable and closable.

A roughly U-shaped striker 141 is attached to a rear portion of the bottom plate 140 of the front seat 32. A seat lock mechanism 142, switchable between a seat lock condition for holding the front seat 32 in a closed state by gripping the striker 141 and a seat unlock condition for permitting opening and closing operations of the front seat 32 by releasing the grip on the striker 141, is disposed at a position corresponding to a central portion in the width direction of the rear seat 33 and at a portion of the top cover 111 of the luggage box 30 located between the front and rear seats 32, 33. The seat lock mechanism 142 is engaged with the striker 141, to come into the seat lock condition, when the front seat 32 in the state of being opened upwardly is lowered to close the front opening portion of the luggage box 30. The seat lock mechanism 142 is switched from the seat lock condition to the seat unlock condition by a pulling operation of a power transmission cable 143.

The seat lock mechanism 142 is provided on a metallic bridge plate 144 provided between the front ends of both the grip portions 118a . . . of the grab rail 118. The bridge plate 144 is formed so as to come into the gap between the top cover 111 and the rear seat 33 from the front ends of both the grip portions 118a . . . and to extend along a front upper surface of the top cover 111.

In addition, a cover 146, provided with a cutout 145 (see FIG. 8) for permitting the striker 141 to be inserted therein and drawn out therefrom, is attached to a front portion at the center in the width direction of the rear seat 33, so as to cover the seat lock mechanism 142 from the upper side in the opened condition of the front seat 32.

Figure 7:
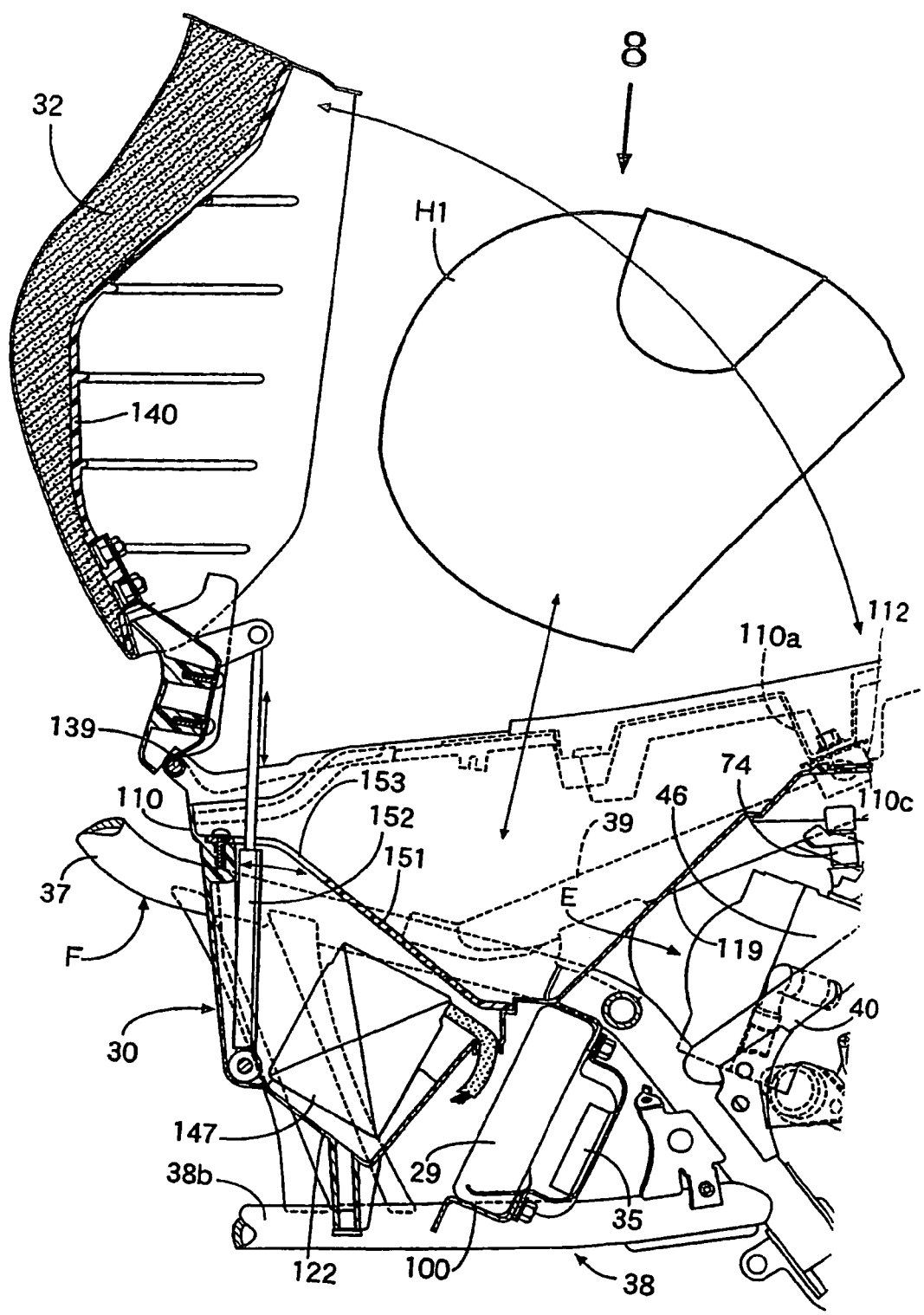
FIG. 7 is an enlarged view of an essential part of FIG. 5 in the condition where a front seat is opened.
Figure 8:
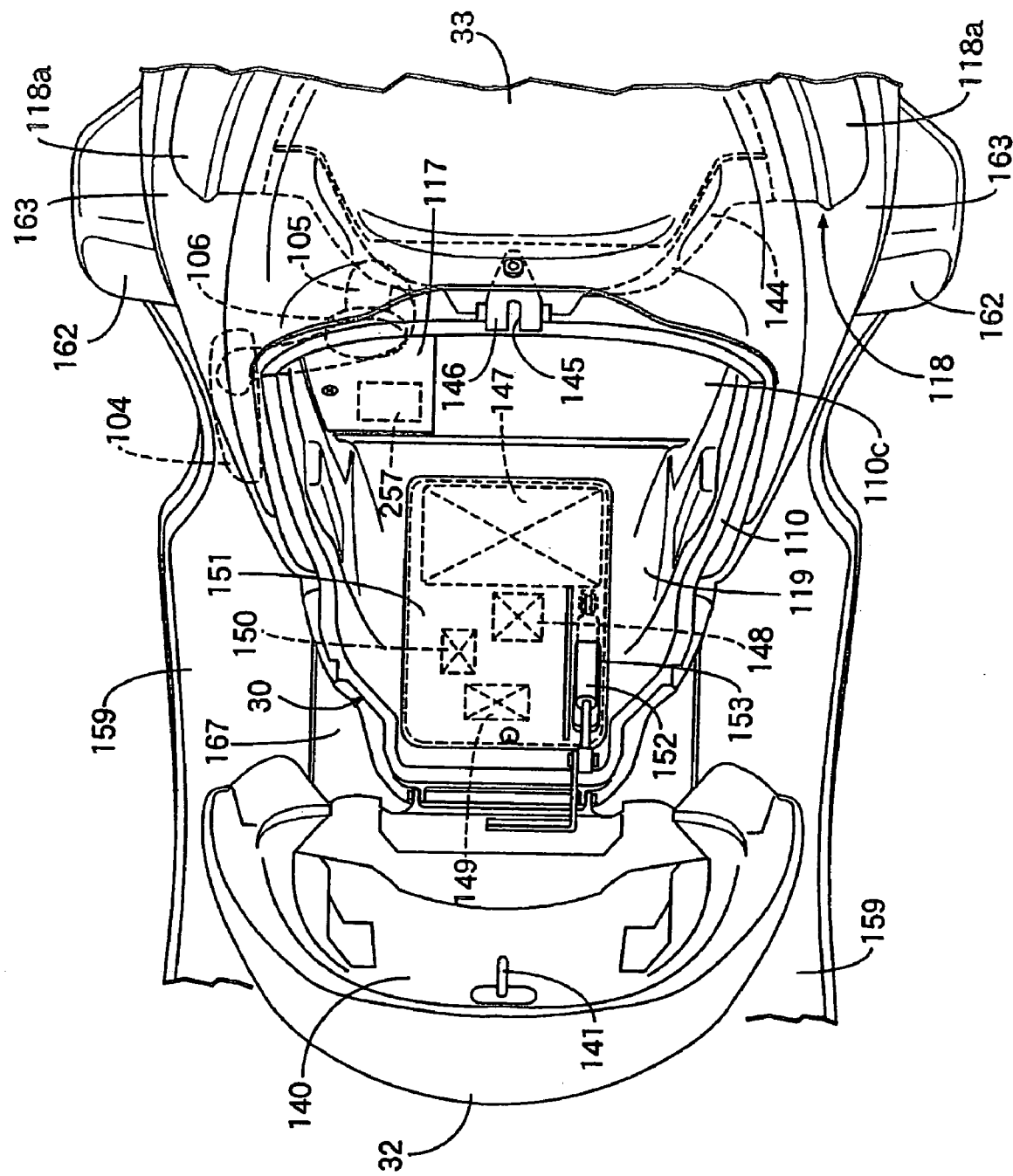
FIG. 8 is a view along arrow 8 of FIG. 7.
Figure 9:
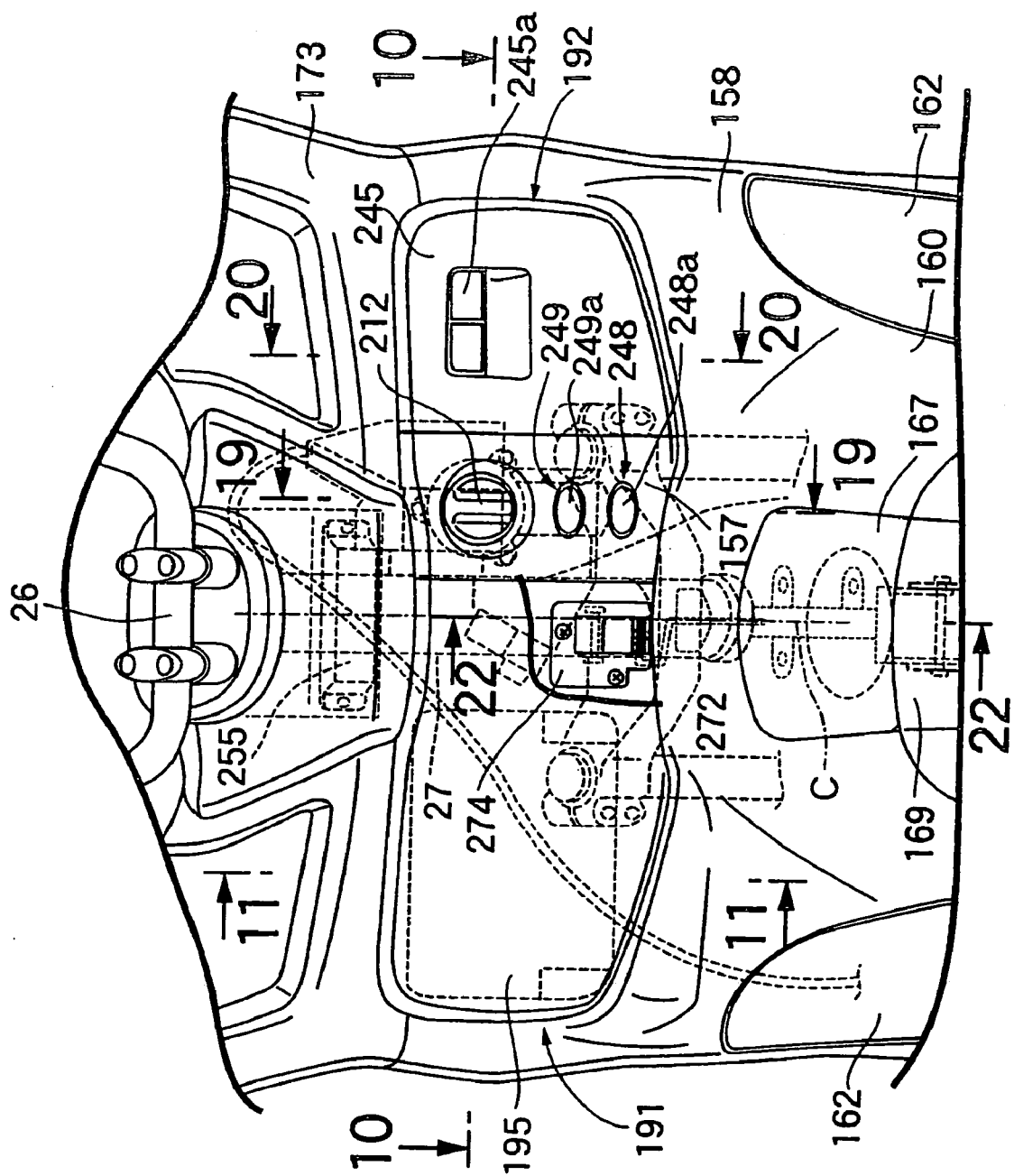
FIG. 9 is an enlarged view along arrow 9 of FIG. 1.
Figure 10:
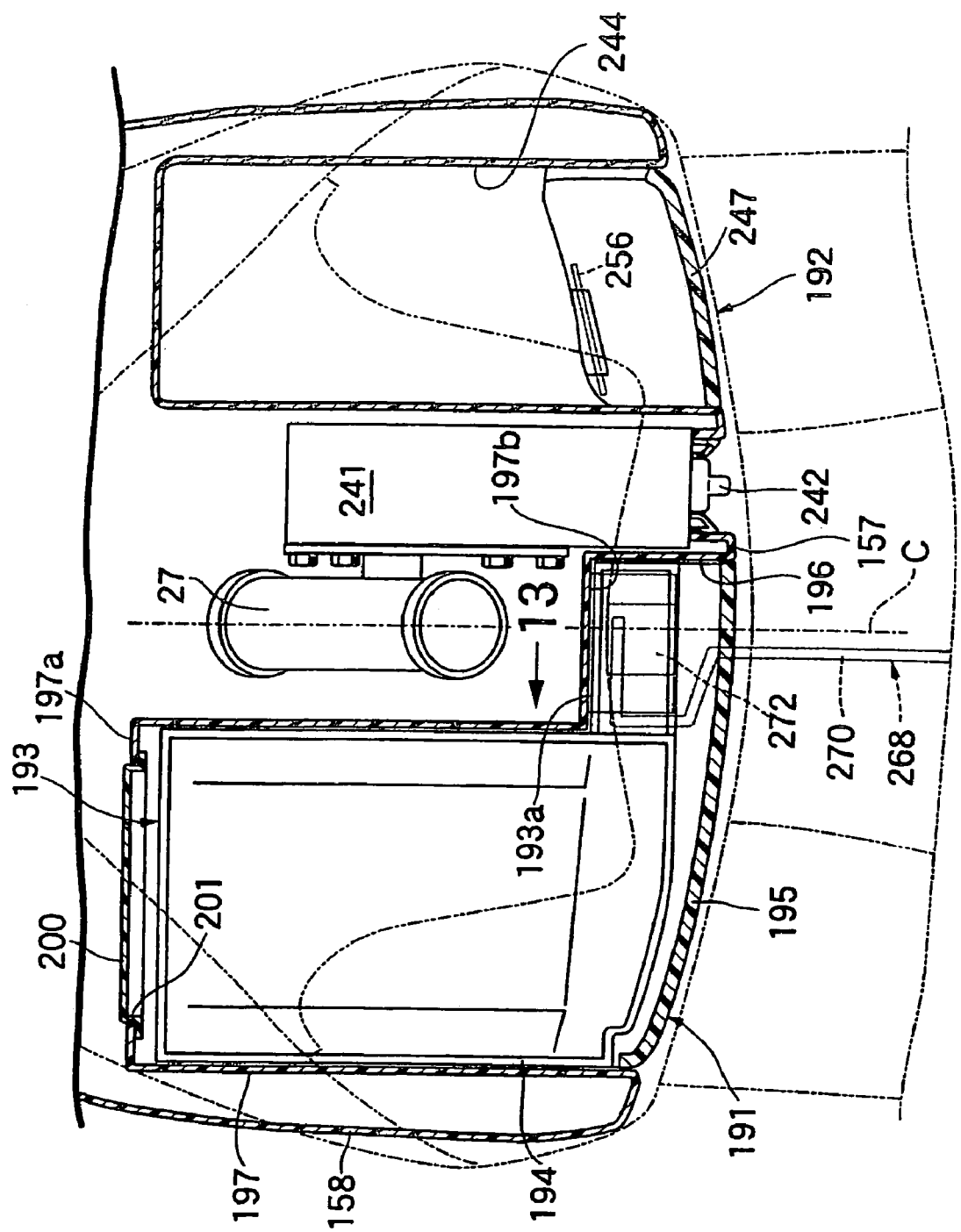
FIG. 10 is a general sectional view along line 10—10 of FIG. 9.
Figure 11:
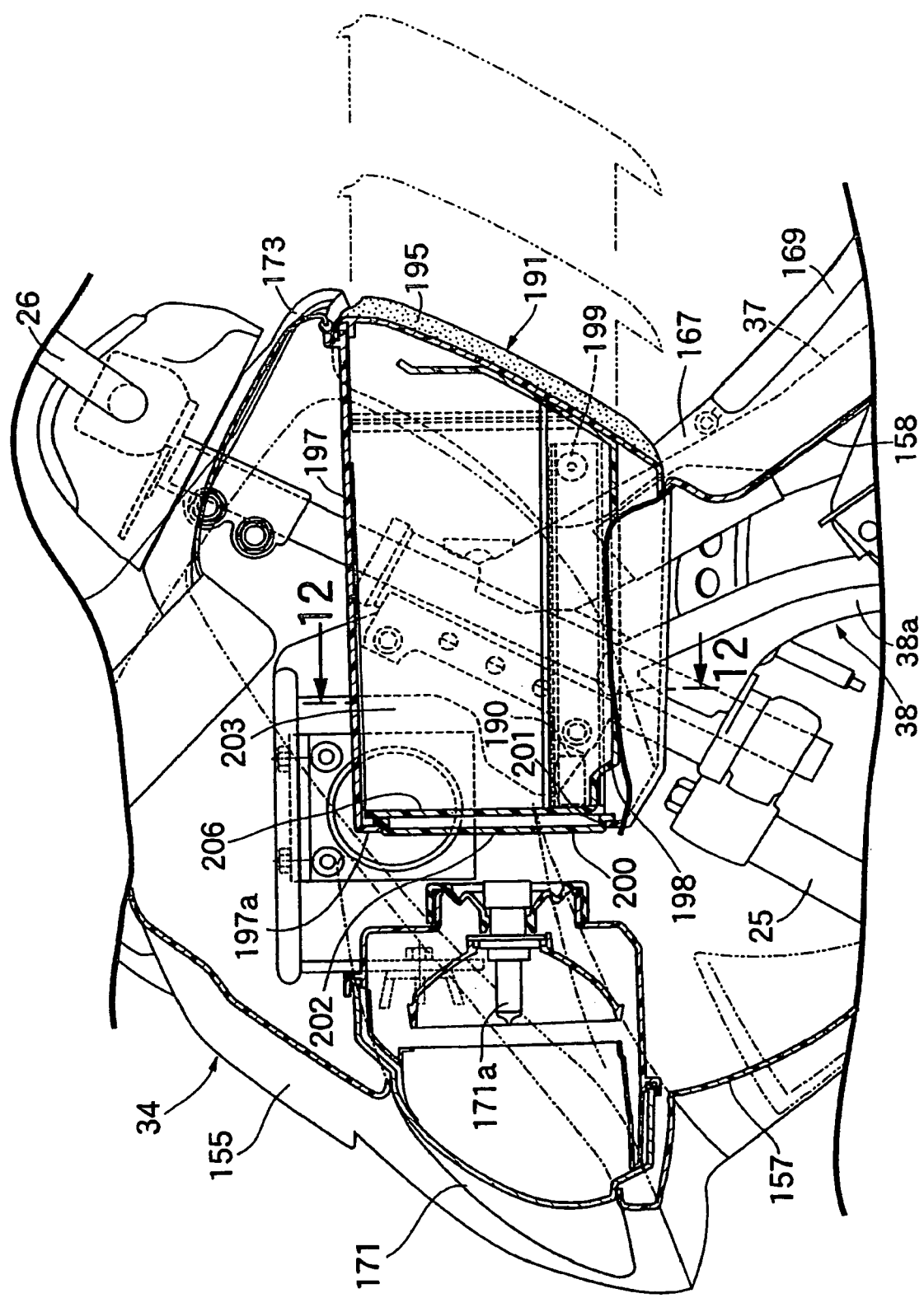
FIG. 11 is a sectional view along line 11—11 of FIG. 9.
Figure 12:
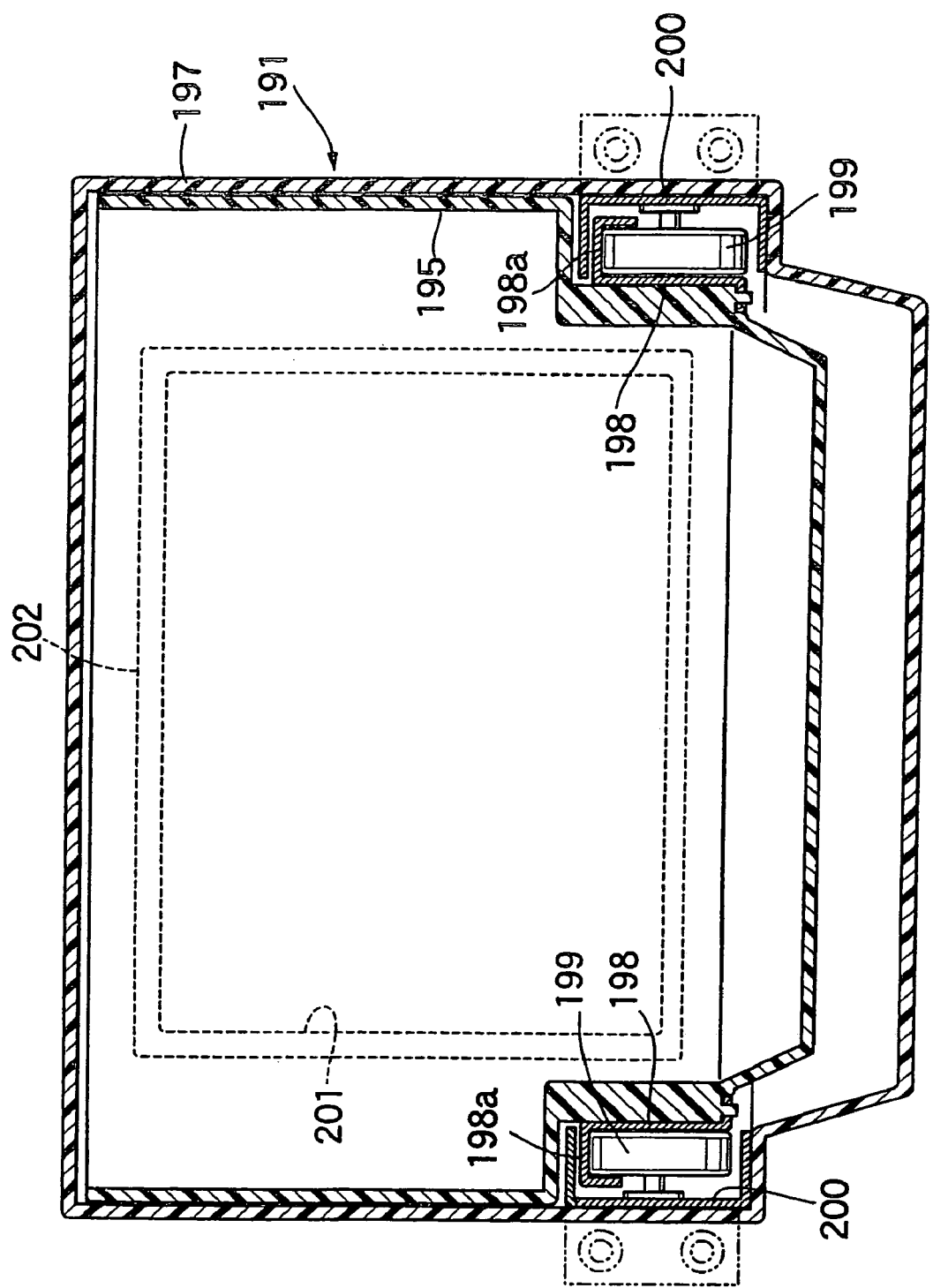
FIG. 12 is a sectional view along line 12—12 of FIG. 11.

Referring to FIGS. 7 and 8 also, the fuel tank 28 is disposed in the vicinity of a step floor 159 possessed by the vehicle body cover 34 and on the front side of the luggage box 30. A front bulging portion 122 bulging forwardly to the vicinity of a bottom portion of the fuel tank 28 is provided at a lower portion of the front end of the luggage box 30 so as to be disposed between the fuel tank 28 and the radiator 29. A battery 147 is contained in the front bulging portion 122. Namely, the battery 147 is disposed between the fuel tank 28 and the radiator 29. In addition, electrical equipment 148, 149, 150 and the like are contained in the front bulging portion 122, in addition to the battery 147.

A second maintenance lid 151 for partitioning between the front bulging portion 122 and the front helmet containing portion 119 is openably and closably attached to the bottom wall of the box main body 110 of the luggage box 30, and maintenance of the battery 147 and the electrical equipment 148 to 150 in the front bulging portion 122 can be performed by opening the second maintenance lid 151 in the condition where the front seat 32 is opened.

In addition, a damper rod 152 for assisting the opening and closing of the front seat 32 by permitting the front seat 32 to be opened with a light force and slowing the closing speed of the front seat 32 at the time of closing is provided between a front portion of the front seat 32 and a front portion of the luggage box 30. A lower portion of the damper rod 152 is contained in the front bulging portion 122, and the second maintenance lid 151 is provided with a slit 153 for passing the damper rod 152 therethrough so as to permit displacements of the damper rod 152 attendant on the opening and closing of the front seat 32.

Again in FIG. 1, the vehicle body cover 34 includes a front cover 155 for covering a front portion of the head pipe 27 and an upper portion of the front wheel WF with a left-right pair of front side covers 156 . . . joined to both left and right sides of the front cover 155. An inner cover 157 is connected to the front side covers 156 . . . so as to cover the head pipe 27 from the rear side with leg shields 158 . . . joined to both the front side covers 156 . . . and the inner cover 157 so as to cover the front side of leg portions of the rider seated on the front seat 32. A left-right pair of floor center covers 160 . . . is connected to the leg shields 158 . . . , extending rearwardly and forming the step floors 159 . . . at lower end portions thereof with a left-right pair of floor side covers 161 . . . drooping downwardly from outer edges of the step floors 159 . . . . A left-right pair of passenger steps 162 . . . is provided respectively at rear portions of the step floors 159 . . . with a left-right pair of body side covers 163 . . . disposed on both lateral lower sides of the rider's seat 31, connected to the floor side covers 161 . . . and extending rearwardly. A rear lower cover 164 is connected to rear lower portions of the body side covers 163 . . . with a rear upper cover 165 disposed between the rear bulging portion 121 of the luggage box 30 and a rear portion of the grab rail 118. A rear center cover 166 is connected to the rear upper cover 165 so as to be located between the left-right pair of tail light units 123 . . . and to cover the small width portion 121a of the rear bulging portion 121 of the luggage box 30 from the rear side.

By parts of the leg shields 158 . . . and the floor center covers 160 . . . , a floor tunnel portion 167 raised upwardly between both the step floors 159 . . . and is formed so as to be disposed in the range from the rear side of the head pipe 27 to the lower side of the front end of the rider's seat 31 and to be located on the upper side of the fuel tank 28 and the radiator 29. An oil supply lid 169 is openably and closably attached to the floor tunnel portion 167, so as to make it possible to supply oil into the fuel tank 28 by opening an oil supply cap 168 possessed by the fuel tank 28 at its upper end. A hinge cover 170 for covering the hinge portion for joining the front seat 32 to the luggage box 30 is joined to the rear end of the floor tunnel portion 167.

Head lights 171 . . . are respectively disposed between both sides of a front portion of the front cover 155 and front portions of the left-right pair of front side covers 156 . . . . Blinkers 172 . . . are respectively disposed on the lower side of the head lights 171 . . . and at front portions of both the front side covers 156 . . . . In addition, a panel 173 for arranging meters is joined to the front cover 155, both the front side covers 156 . . . , the inner cover 157 and upper portions of the leg shields 158 . . . . A meter visor 173a is integrally provided at a front portion of the panel 173 so as to rise upwardly. Further, a windshield 174 is disposed on the front side of the meter visor 173a.

A front fender 175 for covering the front wheel WF from the upper side is supported by the front fork 25. The steering handle 26 is fitted with a left-right pair of rearview mirrors 176 . . . , an audio operating switch case 177, a switch case 178 for operating lamps or the like.

A plug maintenance lid 180 for performing maintenance of an ignition plug 179 of the engine E is openably and closably attached to the left floor center cover 160 of the left-right pair of the floor center covers 160 . . . , at a position on the front side of the passenger step 162.

A license plate 182, a reflector 183 and a license light 184 are attached to a rear fender 181 for covering the rear wheel WR from the rear side. The rear fender 181 is mounted to the rear bulging portion 121 of the luggage box 30 together with the left-right pair of tail light units 123 . . . , the rear upper cover 165 and the rear center cover 166.

In addition, a pair of ribs 110e . . . functioning as rear fender are projectingly provided on the lower surface of the box main body 110 of the luggage box 30 on the front side of the rear fender 181, so as to be disposed on both left and right sides of the rear wheel WR, as shown in FIG. 5.

In FIGS. 9 to 12, the inner cover 157 is provided with a left front containing portion 191 and a right front containing portion 192 at an interval therebetween in the vehicle body width direction. The left front containing portion 191 is configured in a drawer type including a containing case 193 which can be drawn out of the inner cover 157 and removed.

Figure 13:
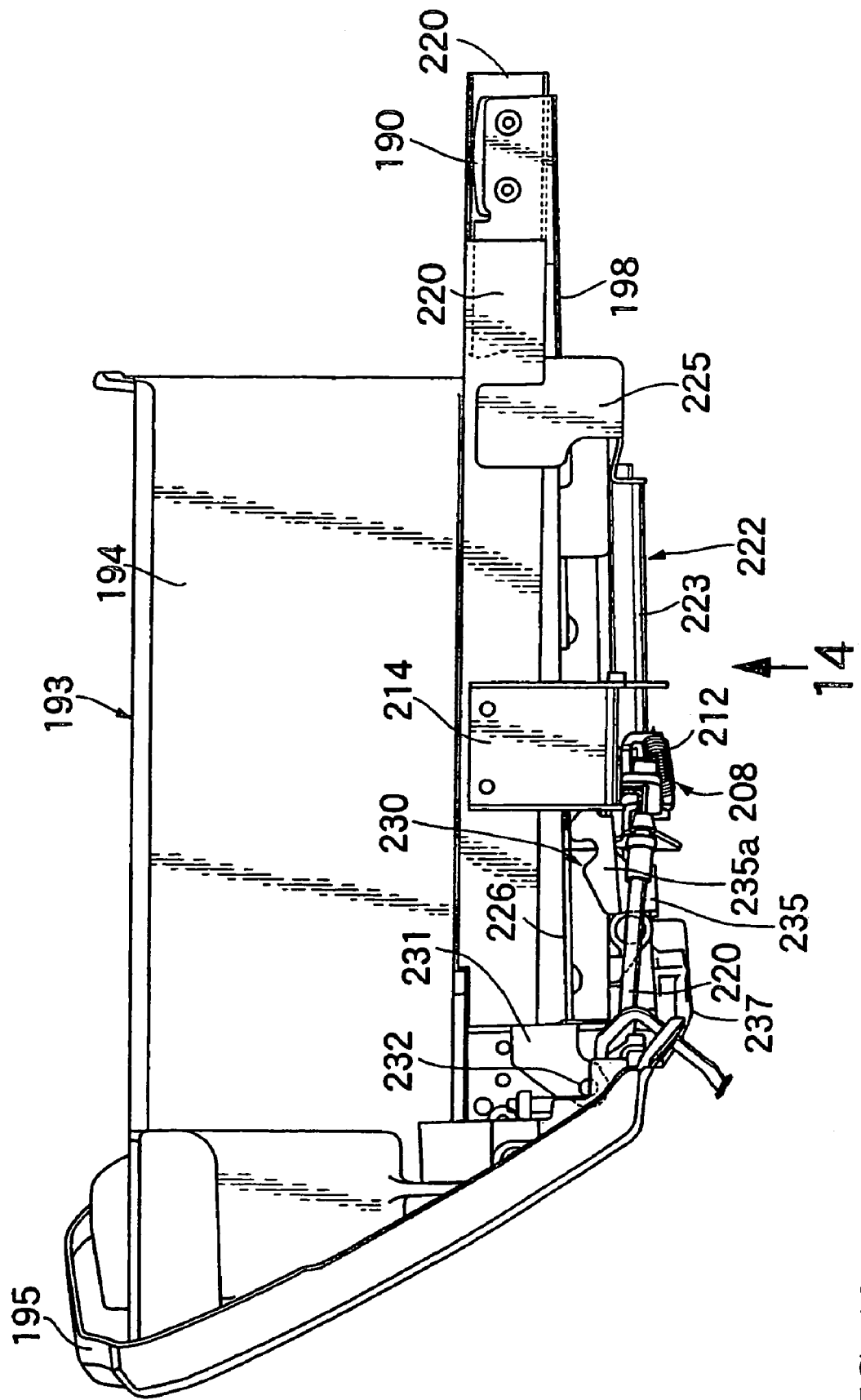
FIG. 13 is a side view along arrow 13 of FIG. 10 of a containing case in a fully closed position.
Figure 14:
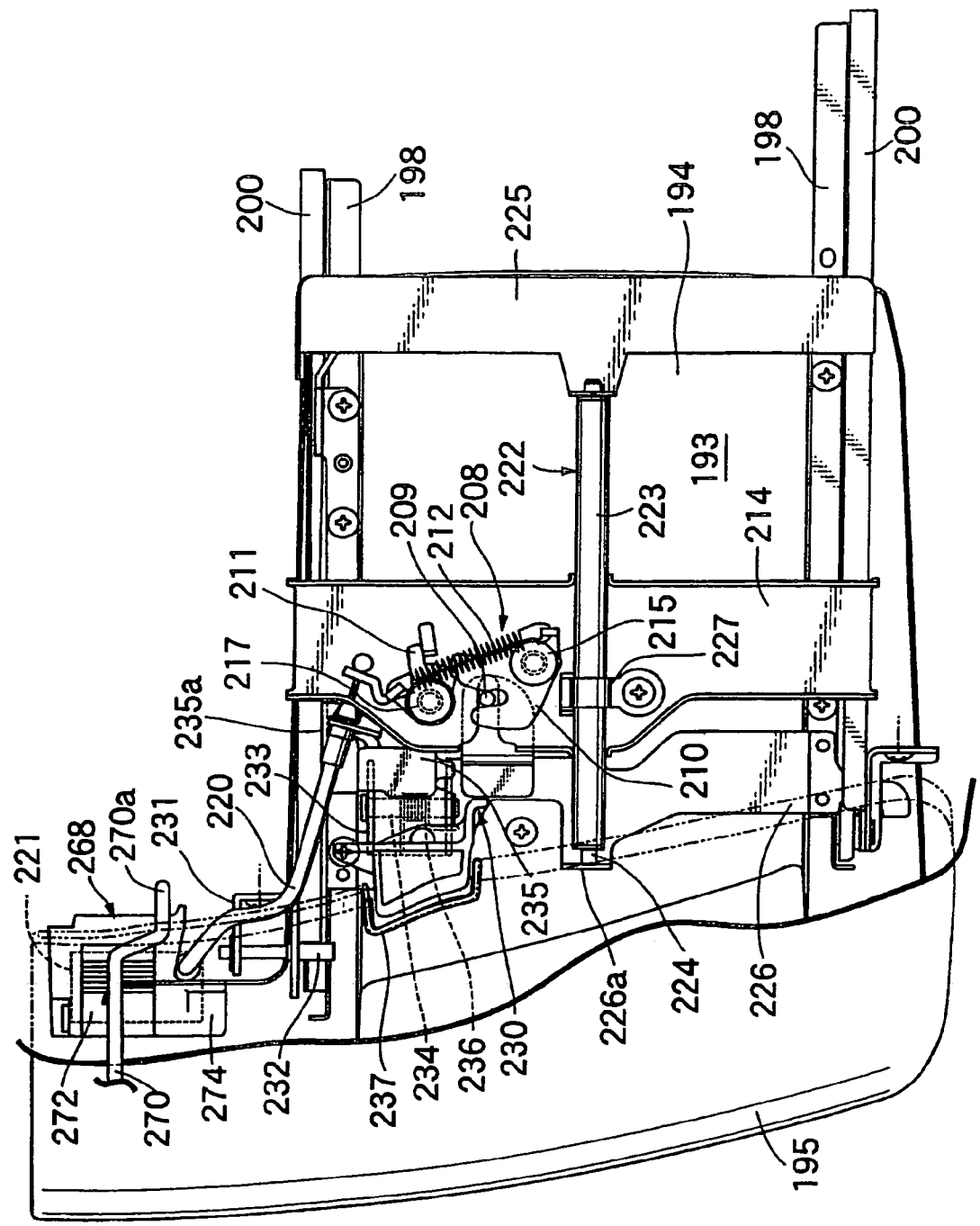
FIG. 14 is a view along arrow 14 of FIG. 13.

Referring to FIGS. 13 and 14 also, the containing case 193 is composed of a case main body 194 formed, for example, of a synthetic resin in a rectangular box-like shape opened at an upper portion. A decorative cover 195, as a cover member, is attached to the outer end of the case main body 194. In addition, the inner cover 157 is provided with a rectangular opening portion 196 for inserting the containing case 193 therein and drawing out the containing case 193 therefrom, and is integrally provided with a storing wall 197 formed in a rectangular tubular shape in connection with the opening portion 196. The inner end of the storing wall 197 is closed with an end wall 197a.

Movable rails 198, 198 extending in the front-rear direction are respectively fixed to both side lower portions of the case main body 194 with support portions 198a, 198a formed in a roughly U-shape opened downwardly and being integrally formed at portions, exclusive of front portions along the vehicle body front-rear direction, of the upper ends of the movable rails 198 . . . . On the other hand, fixed rails 200, 200 extending in the front-rear direction in correspondence with the movable rails 198 . . . are fixed to both inside surfaces of the storing wall 197, and rollers 199, 199 for mounting the support portions 198a . . . of the movable rails 198 . . . are respectively rotatably supported on rear portions of the fixed rails 200 . . . along the vehicle body front-rear direction. On the other hand, sliders 190 for sliding contact with the lower surfaces of upper portions of both the fixed rails 200, 200 are fixed to front portions of the movable rails 198 . . . along the vehicle body front-rear direction.

The containing case 193 is inserted via the opening portion 196 into the storing wall 197 so that the containing case 193 can be slid between a fully closed position where the decorative cover 195 of the containing case 193 is substantially flush with the back surface of the leg shield 158 and a fully opened position where the containing case 193 is mostly drawn out of the storing wall 197, and wherein the entire part of the containing case 193 can be drawn out of the inner cover 157. In addition, the containing case 193 covers the head pipe 27 from the left side when in the fully closed position.

Meanwhile, the end wall 197a of the storing wall 197 is provided with a maintenance window 201 for permitting maintenance work for, for example, replacing a bulb 171a of the head light 171 located on the front side of the end wall 197 when the containing case 193 is drawn out from the leg shield 158. The window 201 is covered with a detachable lid 202.

A projecting portion 193a projecting inwardly in the vehicle body width direction is provided on the outer end side of the containing case 193. The storing wall 197 is provided with a recessed portion 197b for containing the projecting portion 193a when the containing case 193 is stored in the fully closed position, so as to be opposed to the head pipe 27 from the rear side.

Figure 15:
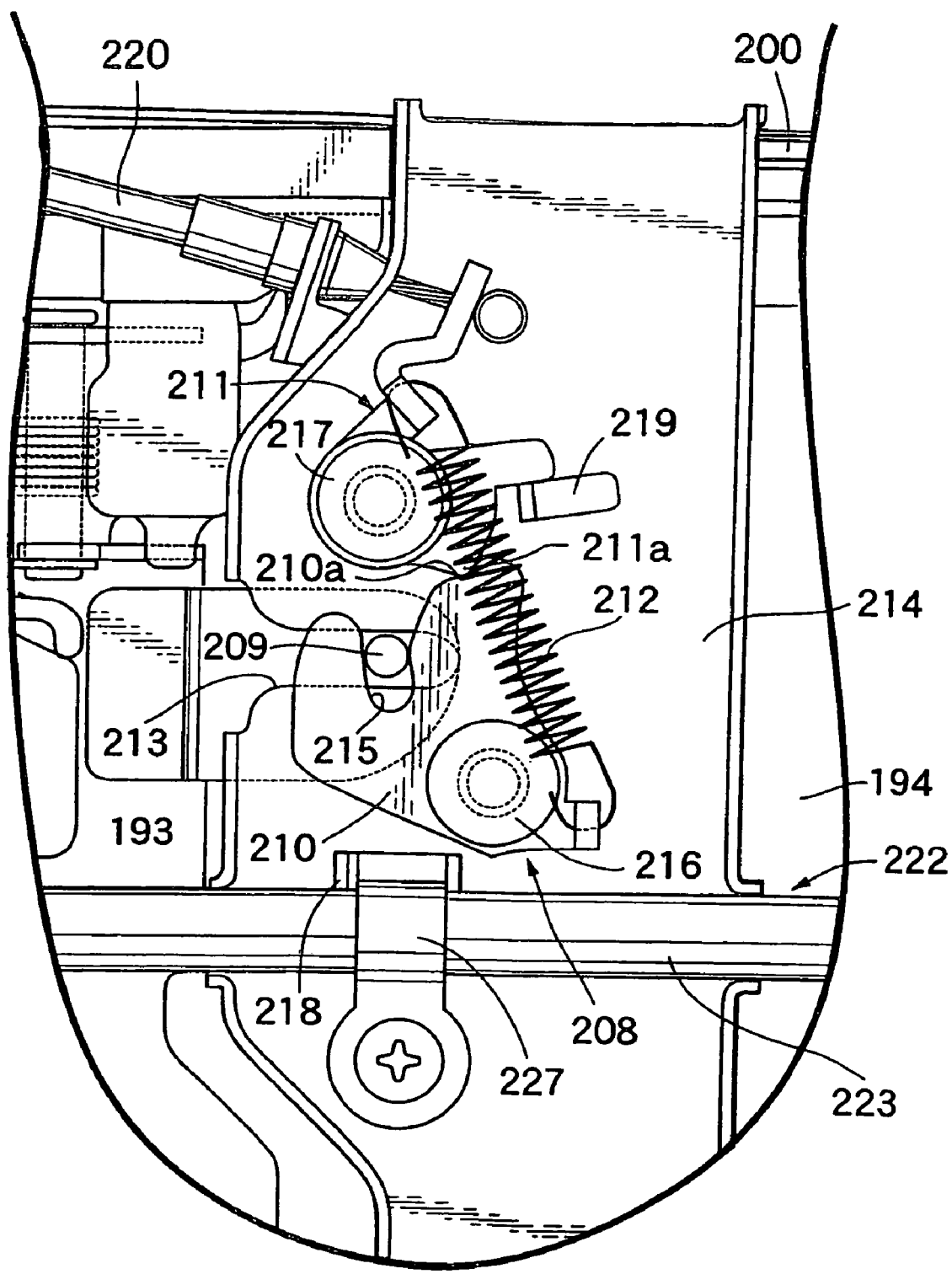
FIG. 15 is a view of a case lock mechanism in the condition where the containing case is in the fully closed lock condition, as viewed in the same direction as FIG. 14.

Referring to FIG. 15, a case lock mechanism 208 for locking the containing case 193 in the fully closed position is provided between the containing case 193 and the inner cover 157. The case lock mechanism 208 includes a pin-like striker 209 attached to the lower surface of the case main body 194 of the containing case 193 with a catcher 210 turnably supported on the inner cover 157 side so as to catch the striker 209 according to the sliding of the containing case 193 toward the closing side to the fully closed position. An engaging member 211 is capable of being engaged with the catcher 210 so as to hold the catcher 210 in the state of catching the striker 209 with a coil spring 212 for biasing the engaging member 211 in the direction for engagement with the catcher 210.

A support frame 214 having a guide recessed portion 213 for inserting the striker 209 therein according to the sliding of the containing case 193 toward the closing direction to the fully closed position is bridgingly disposed between the pair of fixed rails 200, 200 fixed to the inner cover 157, so as to be opposed to the lower surface of the case main body 194. The catcher 210 disposed on the lower side of the support frame 214 is turnably supported on the support frame 214 through a support pin 216. The catcher 210 is provided with an engaging recessed portion 216 for engaging therein the striker 209 inserted into the guide recessed portion 213.

The engaging member 211 is disposed on the lower side of the support frame 214, on the opposite side of the catcher 210 with respect to the guide recessed portion 213, and is turnably supported on the support frame 214 through a support pin 217 parallel to the support pin 216.

The coil spring 212 is disposed in a compressed state between the catcher 210 and the engaging member 211 so as to display a spring force for turningly biasing the catcher 210 counterclockwise in FIG. 15 and for turningly biasing the engaging member 211 clockwise in FIG. 15. The support frame 214 is provided with a stopper 218 for restricting the turning end of the counterclockwise turning of the catcher 210 under the spring force of the coil spring 212, and a stopper 219 for restricting the turning end of the clockwise turning of the engaging member 211 under the spring force of the coil spring 212.

Figure 16:
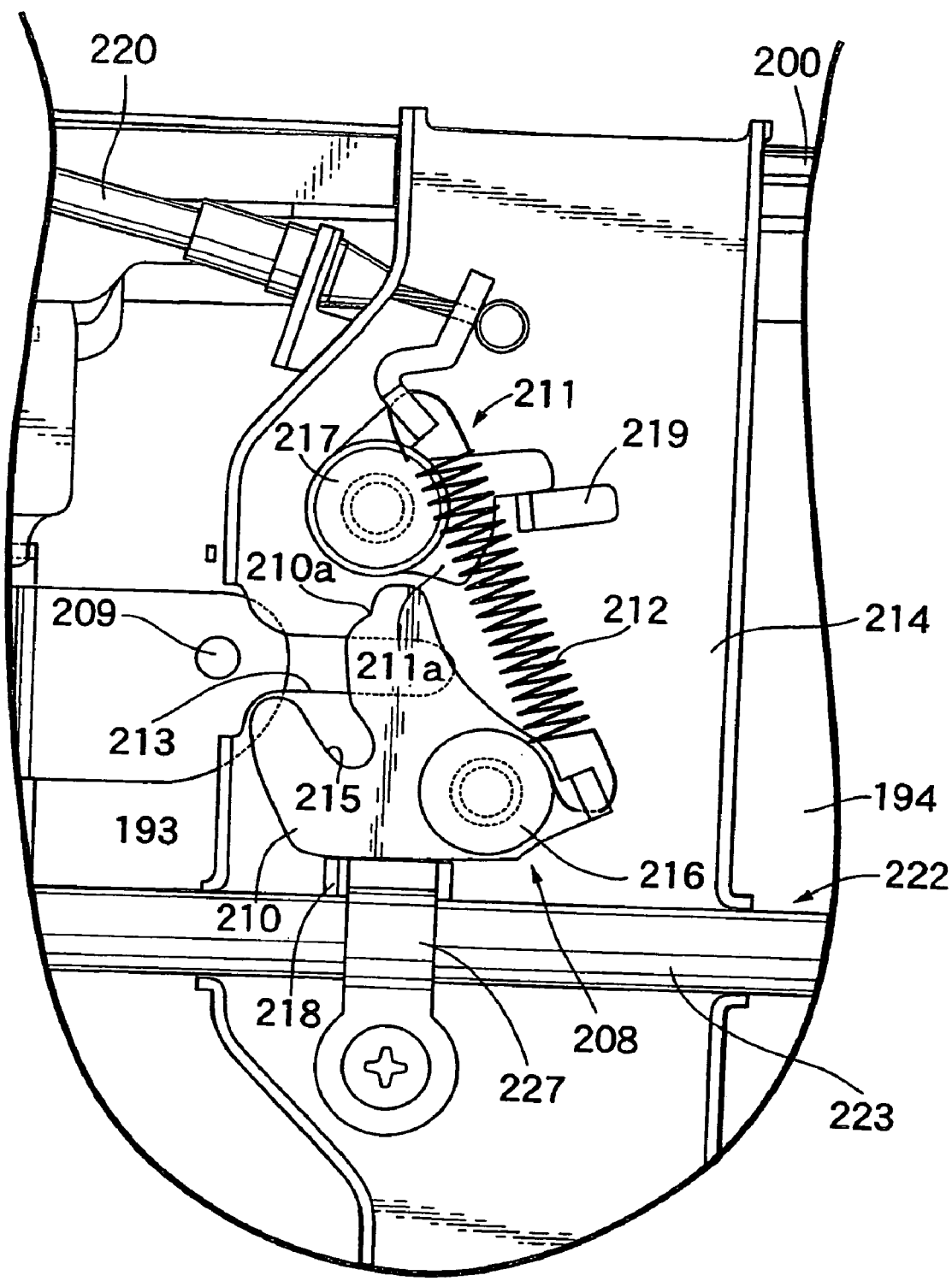
FIG. 16 is a view corresponding to FIG. 15, of the case lock mechanism in an unlocked condition.

In the condition where the striker 209 is released from the guide recessed portion 213 as shown in FIG. 16, the catcher 210 has been turned to the turning restriction end for abutting the stopper 218 by the spring force of the coil spring 212. In this condition, the opening end of the engaging recessed portion 215 is at a position for fronting on the guide recessed portion 213. In addition, a locking step portion 210a fronting on the front side along the turningly biasing direction (counterclockwise direction in FIGS. 15 and 16) by the spring force of the coil spring 212 is provided at a portion, on the engaging member 211 side, of the catcher 210. On the other hand, the engaging member 211 is provided with an engaging projecting portion 211a for restricting the turning of the catcher 210 in the turningly biasing direction of the catcher 210 by engagement with the locking step portion 210a.

When the striker 209 is released from the guide recessed portion 213 as shown in FIG. 16 in the condition where an unlocking force is not exerted on the engaging member 211, the engaging member 211 is in such a position that the engaging projected portion 211a is disengaged from the locking step portion 210a. When the striker 209 is moved from the position indicated in FIG. 16 to the position of coming into the guide recessed portion 213 as shown in FIG. 15, the catcher 210 abuts on the engaging projected portion 211a of the engaging member 211 to turn the engaging member 211 counterclockwise against the spring force of the coil spring 212, thereby riding over the engaging projected portion 211a. After the catcher 210 has ridden over the engaging projected portion 211a, the engaging member 211 is turned clockwise by the spring force of the coil spring 212 to the side for abutting on the stopper 219, and the engaging projected portion 211a is engaged with the locking step portion 210a of the catcher 210. In this condition, even if an external force in an opening direction is exerted on the containing case 193 in order to turn the catcher 210 counterclockwise through the striker 209, the clockwise turning of the engaging member 211 having the engaging projecting portion 211a engaged with the locking step portion 210a is hampered by the stopper 219. Thus, the catcher 210 is not be turned counterclockwise in FIG. 15 so as to release the striker 209 from the engaging recessed portion 215, and the fully closed condition of the containing case 193 is locked by the case lock mechanism 208.

The lock condition of the case lock mechanism 208 can be released (unlocked) by exerting on the engaging member 211 an unlocking force for turning the engaging member 211 in the direction for releasing it from the stopper 219, i.e., in the counterclockwise direction. The unlocking force is exerted from a first electric actuator 221 through the power transmission cable 220 connected to the engaging member 211.

The first electric actuator 221 displays the unlocking force in the direction of pulling the power transmission cable 220 when operated. When the power transmission cable 220 is pulled by the first electric actuator 221 in the lock condition of the case lock mechanism 208, the engaging member 211 is turned counterclockwise so as to cause the engaging projected portion 211a to ride over the locking step portion 210a while turning the catcher 210 clockwise against the spring force of the coil spring 212. When the engaging projected portion 211a has ridden over the locking step portion 210a, the spring force of the coil spring 212 acts so that the catcher 210 is turned counterclockwise to push out the striker 209 in the direction for releasing from the guide recessed portion 213 as shown in FIG. 16, and the catcher 210 abuts on the stopper 218.

More specifically, when the first electric actuator 221 is operated in the lock condition of the case lock mechanism 208, an unlocking force is exerted on the case lock mechanism 208 to release the lock condition, whereby the striker 209, i.e., the containing case 193 is slightly pushed out toward the opening side from the fully closed position by the spring force of the coil spring 212 possessed by the case lock mechanism 208.

In addition, a spring means 222 for providing a spring biasing of the containing case 193 in the direction of a fully opened position in the condition where the containing case 193 is in the fully closed position is provided between the containing case 193 and the inner cover 157. The spring means 222 includes a tube body 223 extending in the vehicle body front-rear direction, a rod 224 which is slidably fitted in the tube body 223 so as to permit relative movements in the axial direction within a limited range in the vehicle body front-rear direction and a part of which projects from the rear end of the tube body 223 along the vehicle body front-rear direction, and a spring (not shown) provided between the tube body 223 and the rod 224 for the purpose of biasing the rod 223 toward the rear side in the vehicle body front-rear direction.

Between the pair of fixed rails 200, 200 on the front side relative to the support frame 214 along the vehicle body front-rear direction, a front support frame 225 is bridgingly disposed so as to be located on the lower side relative to the containing case 193 situated in the fully closed position. The front end of the tube body 223 is fixedly connected to the front support frame 225, and an intermediate portion in the axial direction of the tube body 223 is held by a holding member 227 mounted to the support frame 214. Further, a rear support frame 226 located on the lower side of the containing case 193 is bridgingly disposed between the pair of movable rails 198, 198 on the rear side relative to the support frame 214 along the vehicle body front-rear direction. The rear support frame 226 is provided with an abutting plate portion 226a so as to abut on the rear end of the rod 224 at a position near the fully closed position when the containing case 193 is moved toward the fully closed position side.

With the spring means 222 as above, when the lock condition of the case lock means 208 is released (unlocked) in the condition where the containing case 193 is in the fully closed position, the spring force of the coil spring 212 of the case lock mechanism 208 and the spring biasing force by the spring means 222 are exerted on the containing case 193. The containing case 193 is slightly slid from the fully closed position toward the opening side, after which it suffices to draw out the containing case 193.

Figure 17:
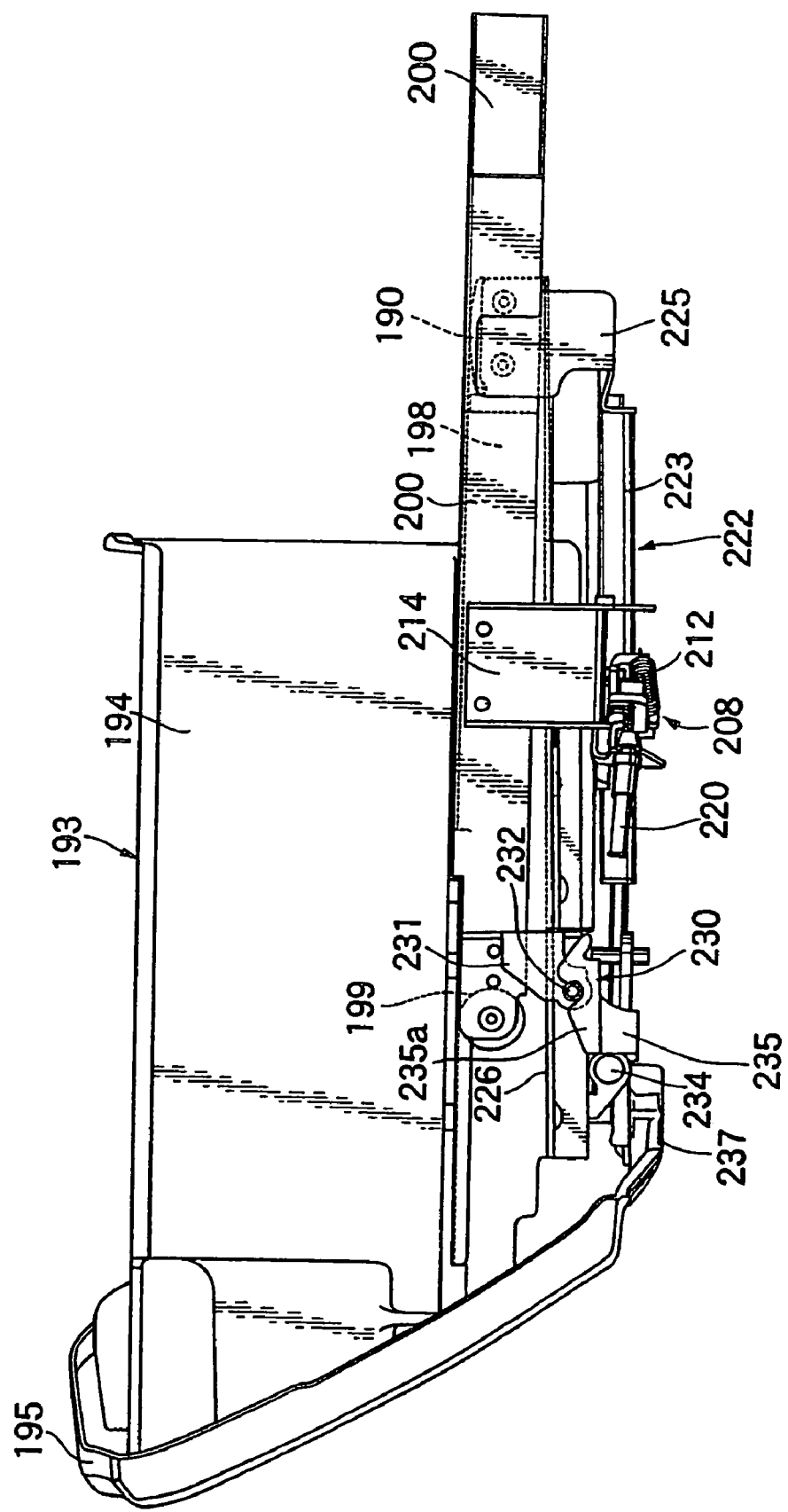
FIG. 17 is a side view corresponding to FIG. 13 in the condition where the containing case is temporarily held at a roughly central portion between the fully closed position and a fully opened position by a holding mechanism.
Figure 18:
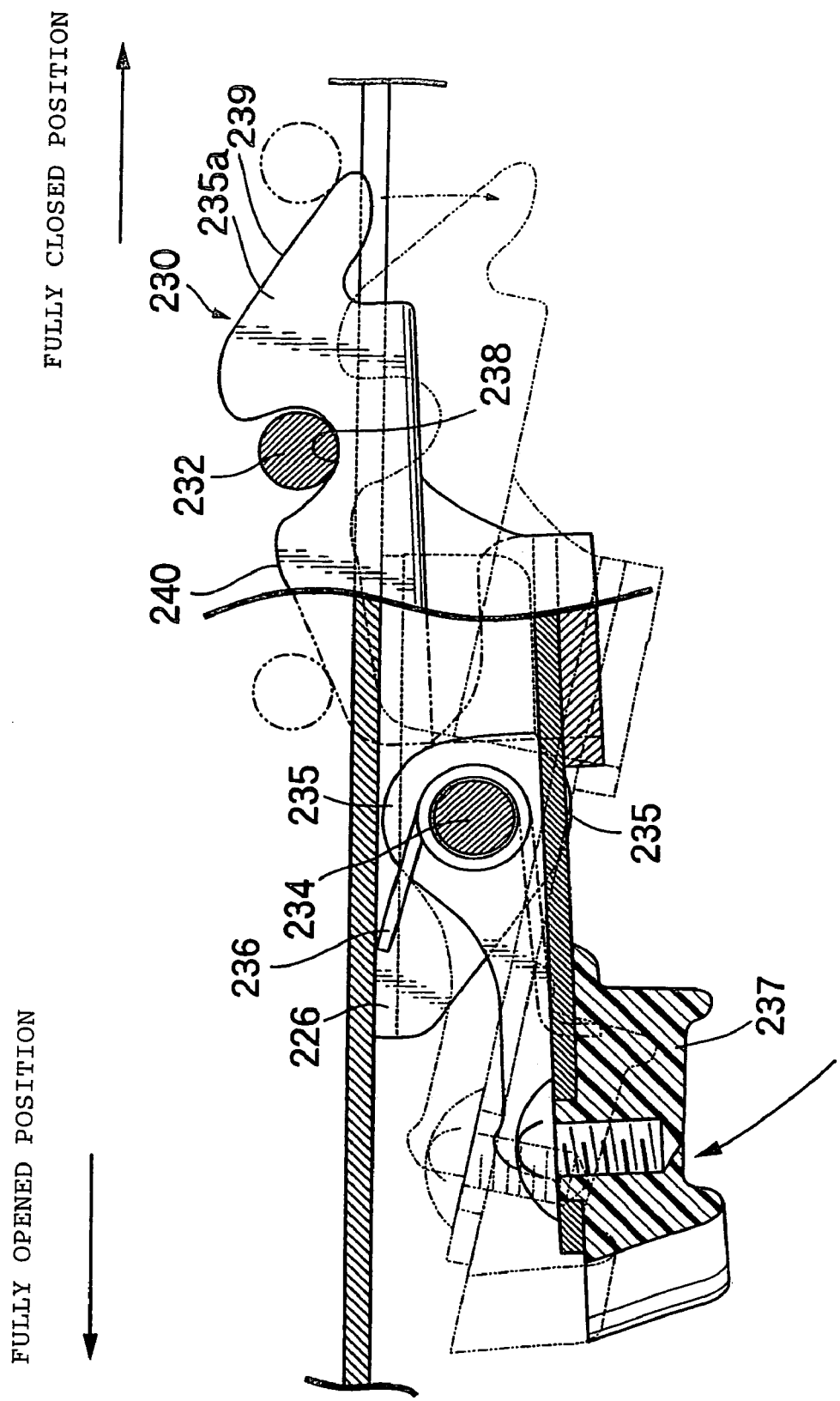
FIG. 18 is a vertically sectional side view for showing the configuration of the holding mechanism.

In FIGS. 17 and 18, a holding mechanism 230, for temporarily holding the containing case 193 at an intermediate position between the fully closed position and the fully opened position, in this embodiment at a roughly central position between the fully closed position and the fully opened position, when the containing case 193 is opened from the fully closed position, is provided between the containing case 193 and the inner cover 157. The position where the containing case 193 is temporarily held by the holding mechanism 230 is set so that, in the condition where a person with a height of not more than 175 cm (a range covers 90% of the population of Japan) is seated on the front seat 32, a drivers' knees do not make contact with the containing case 193 (see the indication by chain lines in FIG. 1).

The holding mechanism 230 includes a locking shaft 232 extending in the vehicle body width direction and supported by a support member 231 attached to the front end of the fixed rail 200 located on the right side (as seen from the rear side in the vehicle body front-rear direction) of the left-right pair of fixed rails 200, 200 fixed to the inner cover 157. A swingable engaging member 235 is swingably supported on a bracket 233 attached to the rear support frame 226 fixed to the containing case 193, through a support shaft 234 having an axis parallel to the locking shaft 232. A torsion spring 236 is provided between the bracket 233 and the swingable engaging member 235 so as to bias the swingable engaging member 235 counterclockwise in FIGS. 17 and 18.

The locking shaft 232 is supported by the support member 231 so that its one end portion projects from the fixed rail 200 to the containing case 193 side. In addition, the swingable engaging member 235 is integrally provided with an engaging portion 235a projecting from the bracket 233 to the fixed rail 200 side, and is turnably supported on the bracket 233. The turning end of the swingable engaging member 235 turningly biased in the direction for upwardly turning the engaging portion 235a, i.e., in the counterclockwise direction in FIGS. 17 and 18 by the spring force of the torsion spring 236 is restricted by the abutment of the swingable engaging member 235 on the rear support frame 226.

The engaging portion 235a is provided at its upside edge with an engaging recessed portion 238 for spring engagement with the locking shaft 232, a front guide surface 239 is disposed on the front side relative to the engaging recessed portion 238 along the vehicle body front-rear direction, and a rear guide surface 240 is disposed on the rear side relative to the engaging recessed portion 238 with the engaging recessed portion 238 between itself and the front guide surface 239.

The front guide surface 239 is formed as an inclined surface inclined rearwardly and upwardly, while the rear guide surface 240 is formed as an inclined surface inclined rearwardly and downwardly at an inclination smaller than the inclination of the front inclined surface 239, in the condition where the swingable engaging member 235 is at the end of turningly being biasing by the torsion spring 236. In addition, of the engaging recessed portion 238, the inside surface on the rear inclined surface 240 side is formed so as to be inclined substantially in parallel to the front guide surface 239 in the condition where the swingable engaging member 235 is at the end of the turningly biasing by the torsion spring 236.

With the holding mechanism 230 as above, when the containing case 193 present in the fully closed position is openingly operated, the locking shaft 232 present at the fixed position makes contact with the rear guide surface 240, whereby the swingable engaging member 235 is turingly driven in the direction for pressing down the engaging portion 235a against the spring force of the torsion spring 236, i.e., in the clockwise direction in FIG. 18. When the containing case 193 is further slid toward the fully opened position side while keeping the rear guide surface 240 in sliding contact, the locking shaft 232 drops from the rear guide surface 240 into the engaging recessed portion 232, whereby the swingable engaging member 235 is turned in the direction for pushing up the engaging portion 235a, i.e., in the counterclockwise direction in FIG. 18 by the spring force of the torsion spring 236, and the engaging recessed portion 238 is brought into spring engagement with the locking shaft 232, whereby the containing case 193 is temporarily held.

Such a temporarily held condition can be released by forcibly turning the swingable engaging member 235 as indicated by chain lines in FIG. 18 against the spring force of the torsion spring 236. Upon this operation, the spring engagement of the locking shaft 232 with the engaging recessed portion 238 is released, resulting in that the containing case 193 being slidingly operated toward the fully opened position side.

Upon an operation to push in the containing case 193 present at the fully opened position toward the fully closed position, the locking shaft 232 abuts on the front guide surface 239 in the course of the process. In this case, since the front guide surface 239 is an inclined surface inclined forwardly and downwardly, a further pushing-in of the containing case 193 turns the swingable engaging member 235 so as to push down the engaging portion 235a, whereby the locking shaft 232 is caused to drop into the engaging recessed portion 238. Since the inside surface of the engaging recessed portion 238 on the rear inclined surface 240 side is inclined substantially in parallel to the front guide surface 239, a further pushing-in of the containing case 193 causes the locking shaft 232 to turn the swingable engaging member 235 so as to further push down the engaging portion 235a, thereby making sliding contact with the rear guide surface 240, so that the containing case 193 can be pushed in to the fully closed position.

Meanwhile, at the time of releasing the temporary holding of the containing case 193 by the holding mechanism 230, it suffices to turningly operate a synthetic resin-made hold release operating member 237 fastened to the swingable engaging member 235 in the direction indicated by an arrow in FIG. 18. The hold release operating member 237 is disposed on the lower surface of the containing case 193 at a position near the vehicle body center line C and near the vehicle body rear side.

A steering handle lock module 241 capable of disabling the steering operation on the steering handle 26 is disposed in the vicinity of the head pipe 27 on the opposite side of the left front containing portion 191, and the right front containing portion 192 is disposed so that the steering handle lock module 241 is located between itself and the left front containing portion 191.

Figure 19:
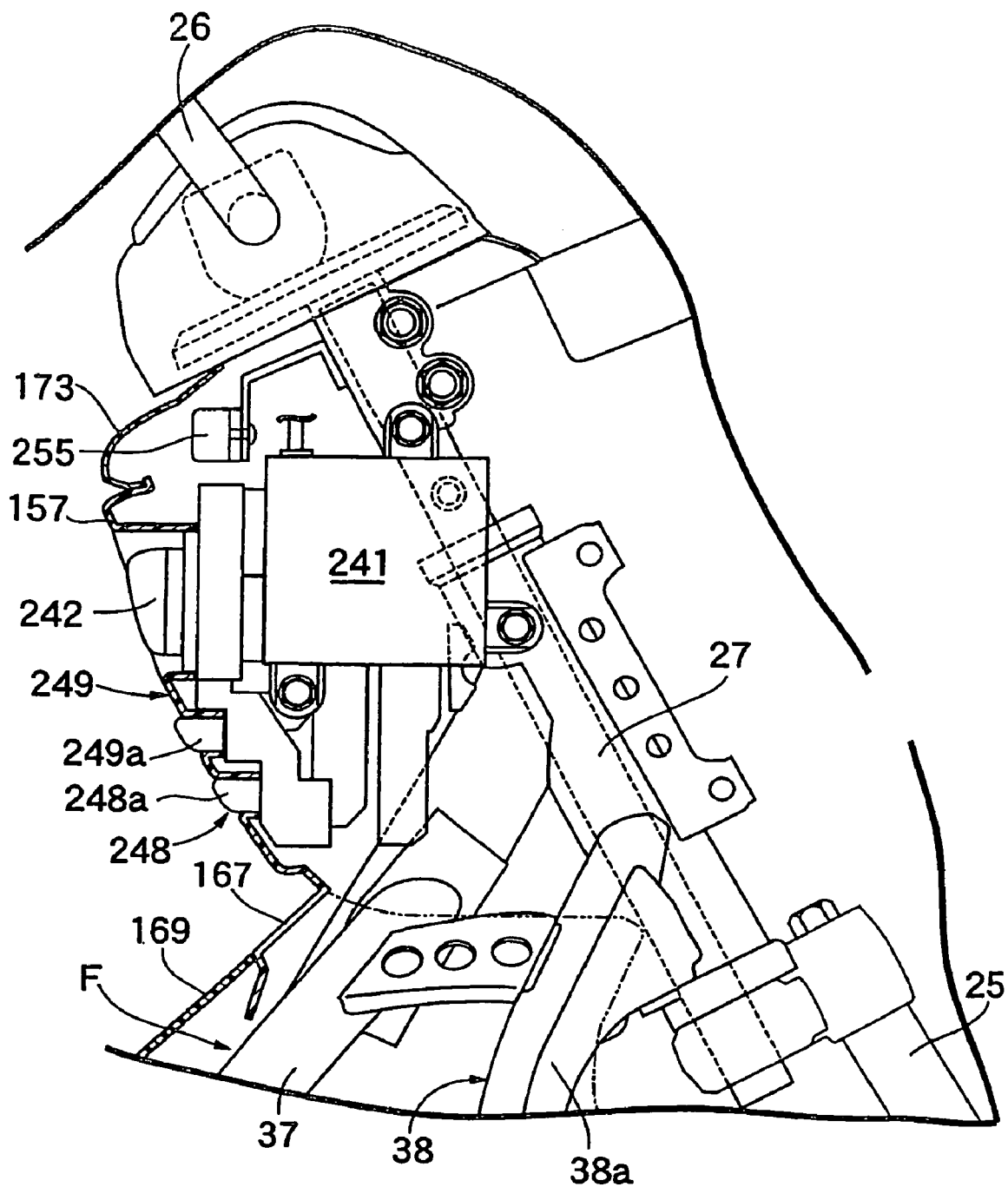
FIG. 19 is a sectional view along line 19—19 of FIG. 9.

In FIG. 19, the steering handle lock module 241 enables the steering operation on the steering handle 26 and enables the starting of the engine E, according to an operation, based on predetermined conditions, of a smart entry knob 242 disposed on the inner cover 157 between the left and right front containing portions 191 and 192. The above-mentioned first electric actuator 221 is disposed in the steering handle lock module 241.

Figure 20:
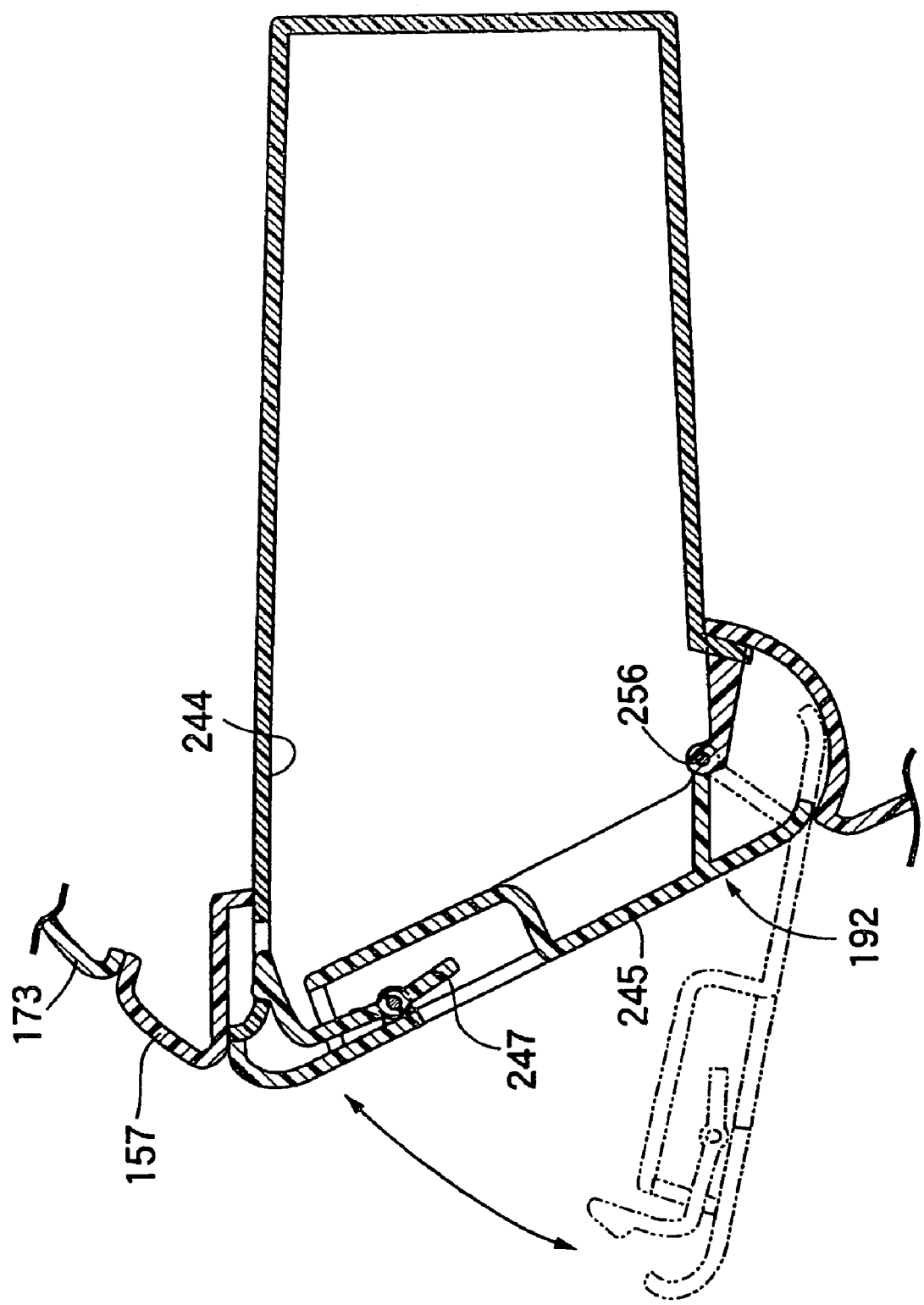
FIG. 20 is a sectional view along line 20—20 of FIG. 9.

In FIG. 20, the right front containing portion 192 has a structure in which a containing recessed portion 244 formed in the inner cover 157 is openably and closably covered with a lid member 245 hinged to the inner cover 157. The containing recessed portion 244 is formed to be smaller than the containing case 193 of the left front containing portion 191 and to be slightly narrowed as the front end is approached.

The lid member 245 is hinged to the inner cover 157 through a pivotal shaft 256 so as to be turnable between an opening position for opening the containing recessed portion 244 by being turned downwardly as indicated by chain lines in FIG. 20 and a closure position for closing the containing recessed portion 244 as indicated by solid lines in FIG. 20. A handle 247 for enabling turning operations is turnably attached to the lid member 215.

A plurality of lock release operating buttons for respectively releasing the lock conditions of a plurality of containing portions inclusive of the left front containing portion 191, in this embodiment the left front containing portion 191 and the luggage box 30, are disposed on the inner cover 157 on the lower side of the smart entry knob 242, i.e., on a lateral side of the left front containing portion 191 and between the left front containing portion 191 and the right front containing portion 192. In this embodiment, a first lock release operating button 248a for the left front containing portion 191 and a second lock release operating button 249a for the luggage box 30 are arranged at positions set off to either the left or right side (in this embodiment, the right side) from the vehicle body center line C, in a vertically aligned pattern, with the first lock release operating button 248a at the lower position.

The first and second lock release operating buttons 248a and 249a constitute parts of first and second lock release switches 248 and 249 for changing the switching modes by operating the operating buttons 248a and 249a. The first and second lock release switches 248, 249 are attached to the inner cover 157 with the first and second lock release operating buttons 248a, 249a fronting on the outside surface of the inner cover 157, and the first and second lock release operating buttons 248a, 249a are formed to be horizontally elongate.

In addition, the first lock release operating button 248a for releasing the lock condition of the left front containing portion 191, the case lock mechanism 208, and the first electric actuator 221 for exerting an unlocking force on the case lock mechanism 208 are disposed at substantially the same height.

Figure 21:
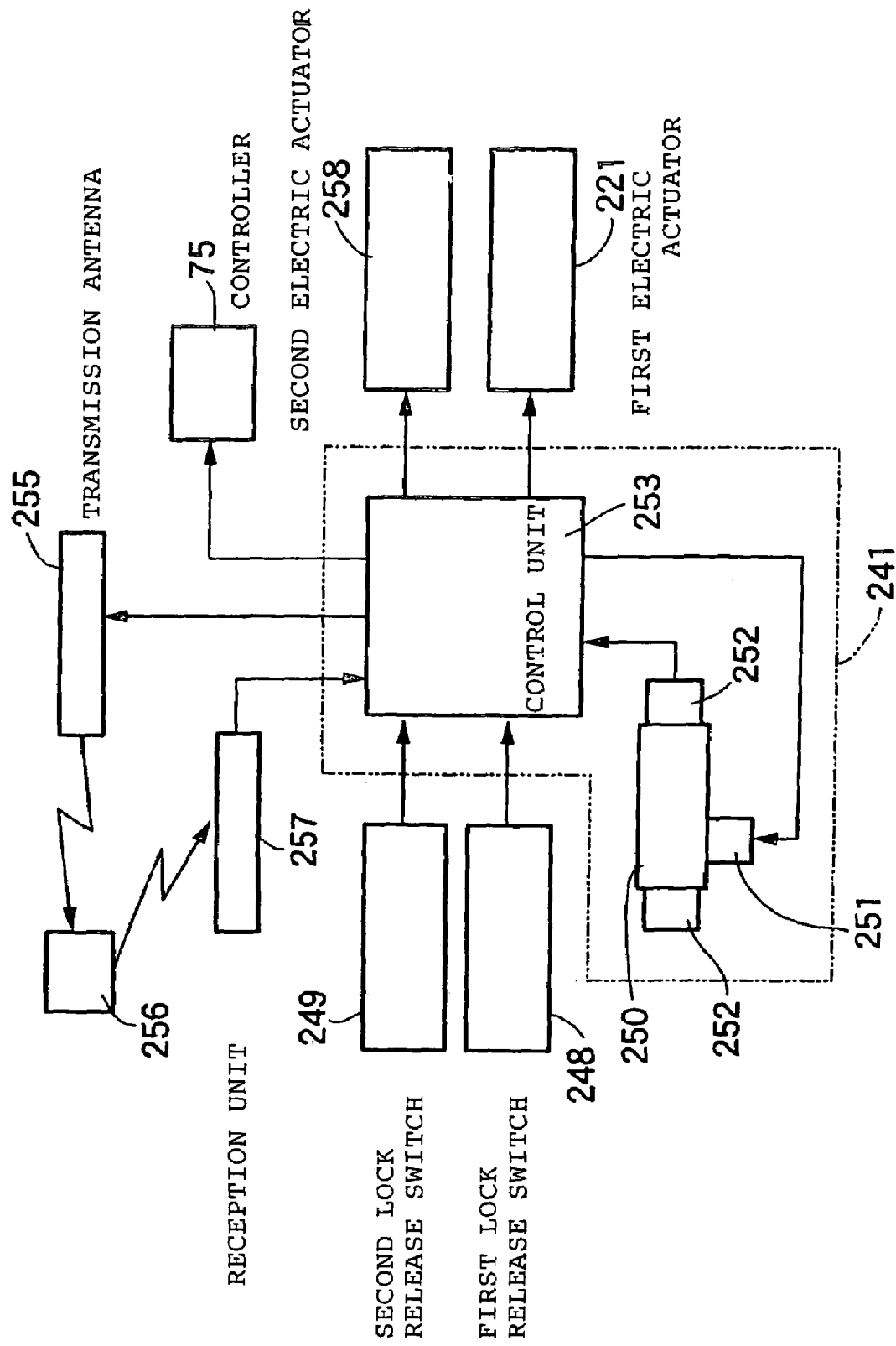
FIG. 21 is a diagram showing the configuration of a smart entry system.

In FIG. 21, the controller 75 contained in the control box 76 attached to the throttle body 68, the steering handle lock module 241, and the first and second lock release switches 248, 249 constitute parts of a smart entry system. The steering handle lock module 241 includes a cylinder lock 250 which can be turned by the knob 242 and which releases the locking of the steering handle 26 to the head pipe 27 when turned, a lock solenoid 251 capable of disabling the turning of the cylinder lock 250, and a main switch 252 switchingly operated according to the turning of the cylinder lock 250. The lock solenoid 251 is controlled by a control unit 253.

The control unit 253 controls a transmission antenna 255 so as to transmit a signal for prompting the transmission of an ID signal from a normal portable transmitter 256 carried by the vehicle user. The result of the signal reception by a reception unit 257 for receiving a signal from the portable transmitter 256 is inputted to the control unit 253. When it is confirmed in the control unit 253 that the ID signal transmitted from the portable transmitter 256 is a predetermined signal, the control unit 253 operates the lock solenoid 251 so as to permit the cylinder lock 250 to be turned by use of the knob 242.

In addition, when it is confirmed in the control unit 253 that the ID signal sent from the portable transmitter 256 is a predetermined signal, the control unit 253 enables a control of the operation of the engine E by the controller 75 according to the conduction of the main switch 252, operates the first electric actuator 221 according to a signal from the first lock release switch 248 in accordance with the operation of the first lock release operating button 248a in the conduction condition of the main switch 252, and operates a second electric actuator 258 according to a signal from the second lock release switch 249 in accordance with the operation of the second lock release operating button 249a in the conduction condition of the main switch 252. The second electric actuator 258 pulls the power transmission cable 143 (see FIGS. 5 and 6) according to the operation thereof, to thereby release the lock condition of the seat lock mechanism 142.

Further, when it is confirmed in the control unit 253 that the ID signal transmitted from the portable transmitter 256 is a predetermined signal, the control unit 253 operates the lock release operating button 248a, whereby the case lock mechanism 208 for the containing case 193 is released, with the result that the containing case 193 can be drawn out to a position in the range from the fully closed position to an intermediate held position. Under the drawn-out condition, a lock release operating member 272 can be operated.

The reception unit 257 is disposed in the luggage box 30 or in the rider's seat 31. In this embodiment, a reception unit containing portion 110f formed by recessing downwardly a part of the shallow portion 110c of the luggage box 30 is provided in the luggage box 30, and the reception unit 257 is contained in the reception unit containing portion 110f. In addition, the shallow portion 110c is provided with the first maintenance lid 117 for performing a maintenance concerning the engine E disposed on the lower side of the luggage box 30, in an openable and closable manner. The reception unit 257 is contained in the reception unit containing portion 110f so as to be covered with a part of the first maintenance lid 117.

On the other hand, the transmission antenna 255 is disposed at a position remote from the steering handle lock module 241. In this embodiment, the transmission antenna 255 is disposed on the upper side of the steering handle lock module 211, for example, directly under the panel 173 constituting a part of the vehicle body cover 34.

Figure 22:
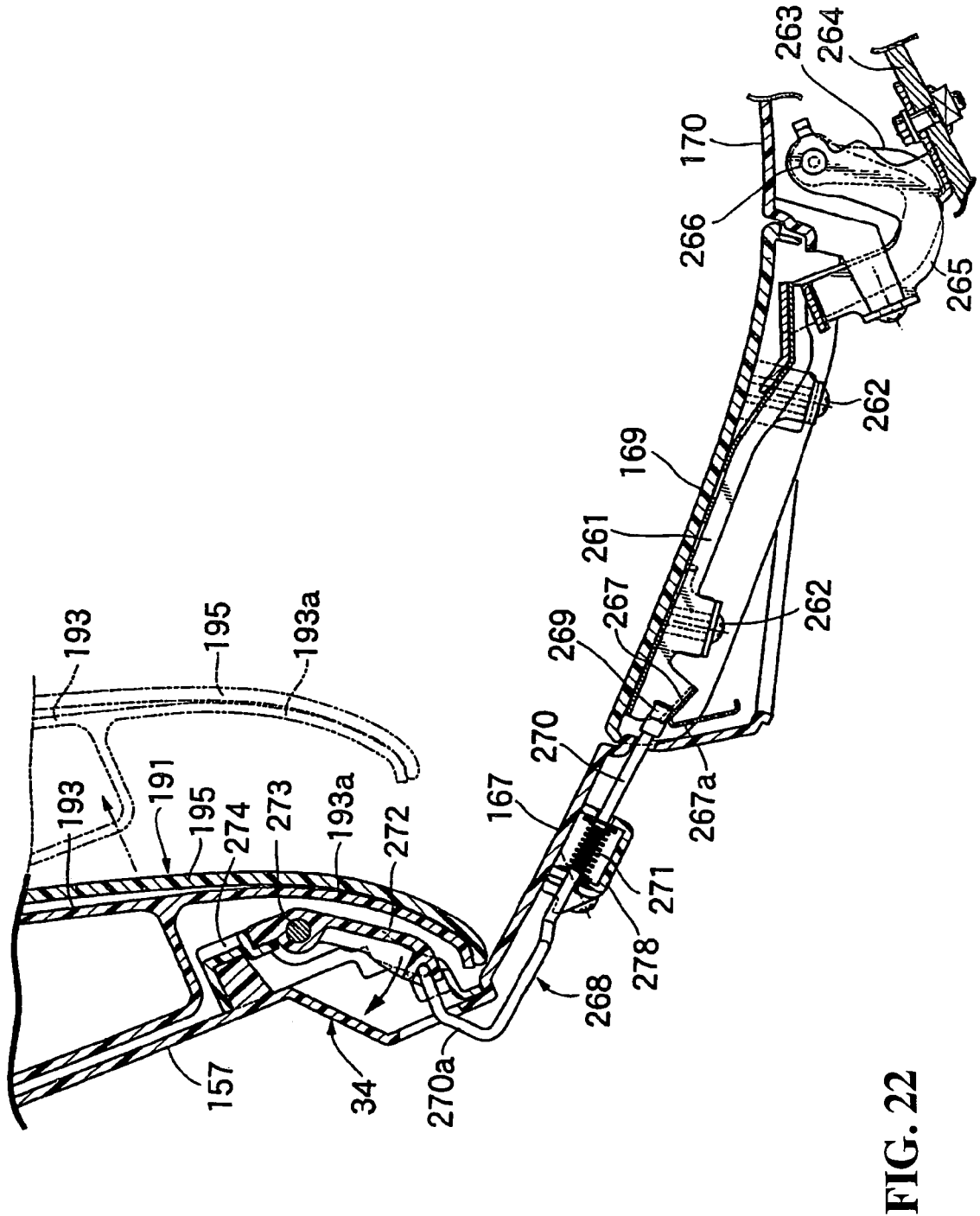
FIG. 22 is a sectional view along line 22—22 of FIG. 9.

In FIG. 22, the oil supply lid 169 is fastened to a frame member 261 extending in the vehicle body front-rear direction by a plurality of screw members 262 . . . . A hinge arm 263 that is in connection with the rear end of the frame member 261 along the vehicle body front-rear direction is turnably supported to a support plate 264 fixed to the vehicle body frame F and to a bracket 265 fixed to the hinge cover 170, through a support shaft 266.

A locking portion 267 is provided at a front end portion of the frame member 261 along the vehicle body front-rear direction with a lid lock mechanism 268 for locking the closed condition of the oil supply lid 169 being engaged with the locking portion 267, thereby holding the oil supply lid 169 in the locked state.

The lid lock mechanism 268 includes a rod 270 extending in the vehicle body front-rear direction on the lower side of the floor tunnel portion 167 on the front side of the oil supply lid 169, and a spring 271 for biasing the rod 270 toward the rear side in the vehicle body front-rear direction. A synthetic resin-made cap 269 capable of engagement with the locking portion 267 is mounted to the rear end of the rod 270.

The rod 270 receives a force in the direction for releasing the engagement of the cap 269 with the locking portion 267, i.e. in the direction toward the front side, against the spring force of the spring 271 by the operation of the lock release operating member 272. The lock release operating member 272 is disposed on the inner cover 157 at a position between the left and right front containing portions 191 and 192 and on either the left or right side (in this embodiment, the left side) from the vehicle body center line C, so as to be covered with the decorative cover 195 disposed on the inner cover 157 when the decorative cover 195 is in a closed condition. In this embodiment, the lock release operating member 272 is disposed on the inner cover 157 at a position set off from the containing case 193 of the left front containing portion 191 and at least partly overlapped with the head pipe 27, as viewed from the rear side in the vehicle body front-rear direction. The decorative cover 195 is attached to the containing case 193 so as to cover the lock release operating member 272 when the containing case 193 is in the fully closed position.

More specifically, the projecting portion 193a projecting inwardly in the vehicle body width direction is provided on the outer end side of the containing case 193, and the decorative cover 195 is attached to the outer end of the containing case 193. Therefore, a support case 274 is attached to the inner cover 157 at such a position so as to be capable of being covered with the projecting portion 193a. An upper portion of the lock release operating member 272 is turnably supported on the support case 274. In addition, the rod 270 is integrally provided at its front portion with a bent portion 270a bent towards the lock release operating member 272 side, and the bent portion 270a is connected to a lower portion of the lock release operating member 272. Therefore, under the condition where the containing case 193 in the left front containing portion 191 is drawn out to an intermediate opened position (the chain-line position in FIG. 22) restricted by the holding mechanism 230 or to a further opened position, when the user pushes in the lock release operating member 272 by the rider's finger placed on the back side of the projecting portion 193a and thereby turns the lock release operating member 272 in the direction of an arrow in FIG. 22, the rod 270 can be operated in such a direction that the cap 269 is released from the locking portion 267.

Figure 23:
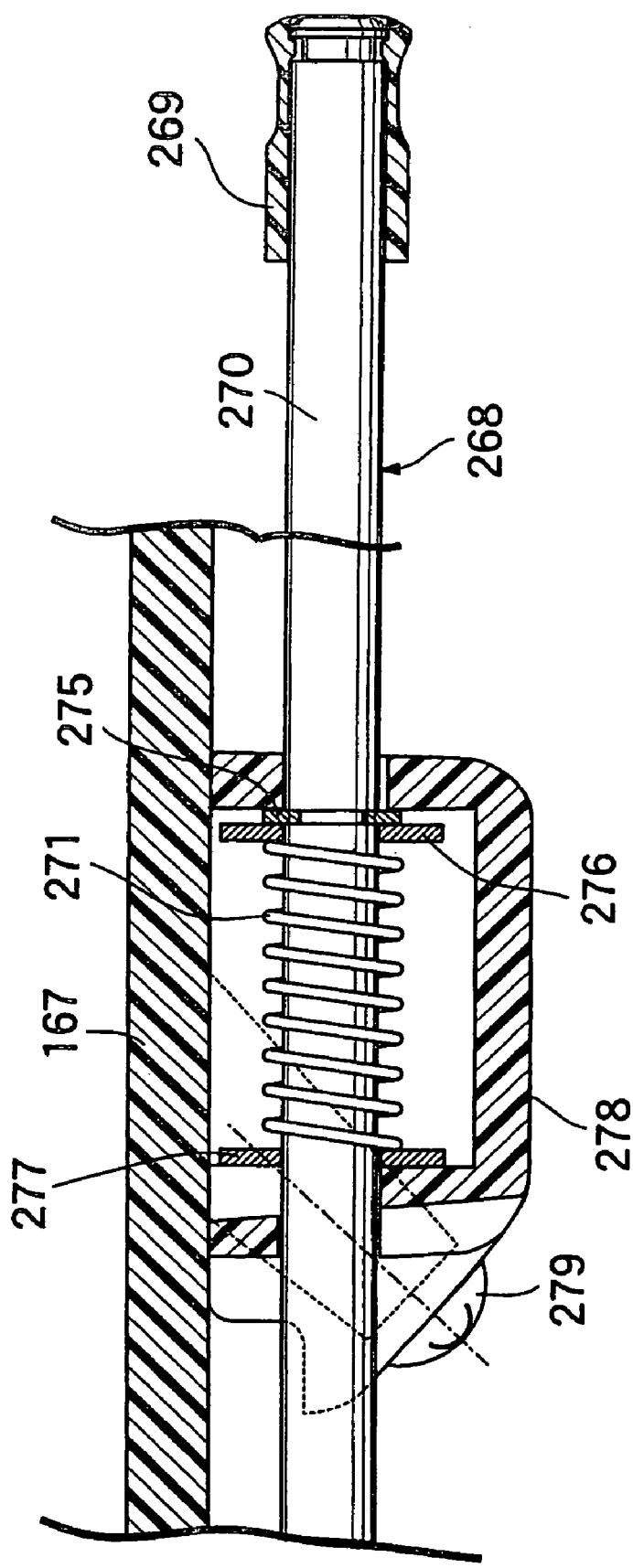
FIG. 23 is an enlarged view of an essential part of FIG. 22.

In FIG. 23, a rod support frame 278 is attached to the inside surface of the floor tunnel portion 167 on the front side relative to the oil supply lid 169, by a screw member 279. An intermediate portion of the rod 270 is held by the rod support frame 278 so as to be movable along the axial direction. In addition, a stop ring 275 is mounted to the rod 270 inside the support frame 278, and the above-mentioned coil-shaped spring 271 surrounding the rod 270 is disposed in a compressed state between an annular spring receiving member 276 capable of engaging with the stop ring 275 from the front side and capable of abutting on and engaging with the rear wall of the rod support frame 278 and an annular spring receiving member 277 capable of abutting on and engaging with the front wall of the rod support frame 278.

Meanwhile, at the time of closing the oil supply lid 169 being in an opened state, it is necessary to push the rod 270 of the lid lock mechanism 268 forwards. In this case, since a pushing plate portion 267a for pushing the cap 269 at the rear end of the rod 270 towards the rear side according to the closing operation on the oil supply lid 169 is integrally provided in connection with the locking portion 267 on the oil supply lid 169 side, closing the oil supply lid 169 from the opened state causes the pushing plate portion 267a to push the rod 270 towards the front side through the cap 269. Wen the oil supply lid 169 is turned to the closed position, the rod 270 is moved rearwardly by the spring force of the spring 271, and the cap 269 is engaged with the locking portion 267, whereby the closed condition of the oil supply lid 169 is locked.

Now, the functions of this embodiment will be described below. At a rear portion of the luggage box 30, which includes the front helmet containing portion 119 disposed on the lower side of the front seat 32 possessed by the tandem type rider's seat 31 and the rear helmet containing portion 120 disposed on the lower side of the rear seat 33 possessed by the rider's seat 31, there is provided the rear bulging portion 121 bulging to the rear side relative to the rear end of the rear seat 33 and the support pipe 62 which is the mount portion for mounting an upper portion of the rear shock absorber 64 to a rear portion of the vehicle body frame F. Therefore, the inside volume of the containing box 30 can be enlarged while ensuring that long things such as golf clubs extending to the rear side relative to the rear end of the rider's seat 31 can be contained in the luggage box 30. Moreover, small things other than the helmet can also be contained in the rear portion of the luggage box 30, so that things which are used less frequently, such as tools, can be suitably contained in the rear portion of the luggage box 30.

In addition, since the rear bulging portion 121 bulges rearwardly to substantially the same position as the rear end of the grab rail 118 disposed around the rear seat 33, the inside volume of the luggage box 30 can be more enlarged, and the rear portion of the luggage box 30 can be protected by the grab rail 118.

In addition, since the small width portion 121a entering between the left and right tail light units 123 . . . in the top plan view is provided at a rear portion of the rear bulging portion 121, the inside volume of the luggage box 30 can be enlarged by utilizing effectively the space generated between the left-right pair of tail light units 123 . . . . Thus, the formation of a space for replacement of bulbs of the tail light units 123 . . . is facilitated.

Meanwhile, the luggage box 30 has the top cover 111 disposed on the lower side of the rear seat 33, and the containing space 128 capable of being utilized according to the attachment and detachment of the rear seat 33 is formed on the upper surface of the top cover 111. Therefore, a space for containing small things, other than the inside of the luggage box 30, can be secured while obviating an increase in the number of component parts and a complication of the structure. In addition, since the containing space 128 is formed inside the first rib 127 erected on the top cover 111 and connected endlessly and the second rib 129 connected endlessly so as to cooperate with the first rib 127 in forming a labyrinth structure droops down from the bottom plate 33a of the rear seat 33, penetration of rainwater, dust or the like into the containing space 128 from the surroundings can be prevented with a simple structure.

Moreover, since the illumination means 116 for illuminating the inside of the luggage box 30 is attached to the inside surface of the luggage box 30 at a portion corresponding to a front portion of the top cover 111, the inside of a rear portion of the luggage box 30 which tends to be darkened due to the presence of the top cover 111 can be effectively illuminated without being obstructed by the things contained in the rear portion of the luggage box 30. Further, the inside surface of the luggage box 30 is easy to check visually, at the portion corresponding to the front portion of the top cover 111. Thus, it is possible to easily confirm the failure of a bulb of the illumination means 116 and similar problems.

In addition, since the rear upper cover 165 and the rear center cover 166 for covering the rear bulging portion 121, the left-right pair of tail light units 123, and the rear fender 181 are attached to the rear bulging portion 121, a plurality of members disposed in the surroundings of a rear portion of the luggage box 30 can be removed at a stroke by simply detaching the wiring for the tail light units 123 . . . , leading to an excellent maintainability.

The luggage box 30 includes the shallow portion 110c disposed between the front helmet containing portion 119 and the rear helmet containing portion 120. The throttle body 68 fitted with the control box 76 containing the controller 75 and the fuel injection valve 74 are disposed on the lower side of the shallow portion 110c so that their upper end positions are substantially the same. Therefore, by making a flat shallow portion 110c between the front and rear helmet containing portions 119 and 120, the shallow portion 110c can be effectively utilized as a containing portion, and a part of the intake system of the engine E can be effectively disposed in the space on the lower side of the shallow portion 110c.

A lower portion of the rear bulging portion 121 is disposed on the lower side relative to the mount portion for mounting an upper portion of the shock absorber 64 to a rear portion of the vehicle body frame F for forming, in the rear bulging portion 121, the containing portion 124 so that raised portion 110d formed by partly raising the bottom wall of the luggage box 30 upwardly is located between the containing portion 124 and the rear helmet containing portion 120. In addition, the rear helmet containing portion 120 and the containing portion 124 on the rear side relative to the rear helmet containing portion 124 are partitioned from each other by the raised portion 110d, whereby enhanced convenience in use can be contrived, and movements of small things contained in the containing portion 124 on the rear side can be inhibited.

In addition, since the fuel tank 28 formed to be elongated in the vertical direction in a side view is disposed on the front side of the luggage box 30 and the luggage box 30 is provided at a lower portion of its front end with the front bulging portion 122 bulging forwardly to the vicinity of a bottom portion of the fuel tank 28, a front portion of the luggage box 30 can be formed deep to facilitate containment of long things. Thus, the capacity of the luggage box 30 can be enlarged.

Moreover, since the battery 147 and other electrical equipments 148 through 150 are contained in the front bulging portion 122, the battery 147 and the electrical equipments 148 through 150 can be contained in the luggage box 30 without obstructing the containment of the helmet H1 and the like.

Further, the second maintenance lid 151 for partitioning the inside of the front bulging portion 122 and the front helmet containing portion 119 from each other is openably and closably attached to the luggage box 30, whereby the things contained in the front bulging portion 122 and the helmet H1 contained in the front helmet containing portion 119 can be prevented from being damaged through mutual contact.

Further, since a lower portion of the damper rod 152, extending vertically so as to assist the opening and closing operations of the front seat 32, is contained in the front bulging portion 122, it is unnecessary to secure a space for disposing the damper rod 152 in the outside of the luggage box 30. Moreover, it is possible to prevent the damper rod 152 from obstructing the positioning of things into the luggage box 30 and to minimize the possibility of the exposure of the damper rod 152 to the exterior when the front seat 32 is opened, thereby enhancing the appearance quality.

The fuel tank 28 and the radiator 29 are disposed on the lower side of the floor tunnel portion 167 formed by a part of the vehicle body cover 34 covering the vehicle body frame F. The vehicle body frame F includes the head pipe 27, the left-right pair of upper down frames 37 . . . extending rearwardly and downwardly from the head pipe 27, and the left-right pair of lower down frames 38 . . . having the inclined portion 38a extending rearwardly and downwardly from the head pipe 27 on the lower side relative to the connection portion for connection of the upper down frames 37 . . . to the head pipe 27. The fuel tank 38, extending vertically over the range from the rear side of a lower portion of the head pipe 27 to lower portions of both the lower down frames 38 . . . , is disposed in the space surrounded by both the upper down frames 37 . . . and both the lower down frames 38 . . . and being immediately on the rear side of the front wheel WF.

Therefore, since the fuel tank 28, elongate vertically, is disposed immediately on the rear side of the front wheel WF, it is possible to prevent the portion corresponding to a lower portion of the head pipe 27 from becoming a dead space, and to dispose component parts by effectively utilizing the space on the lower side of the floor tunnel portion 167. In addition, since the fuel tank 28 having a comparatively large weight is disposed close to the front wheel WF, the distribution load of the front wheel WF can be enhanced, and enhanced steering performance can be contrived. In addition, the fuel tank 28 is elongate vertically and can provide a comparatively large residual amount of the height in the condition where the residual fuel amount is small, so that where the pump unit 97 is annexed to the fuel tank 28. In this embodiment, the structure is advantageous for suction into the pump.

In addition, since the radiator 29 is disposed on the rear side of the fuel tank 28 and the battery 147 is disposed between the radiator 29 and the fuel tank 28, the vertically elongated shape of the fuel tank 28 permits the space on the rear side of the fuel tank 28 to be set comparatively wide. Thus, the battery 147 having a large weight can be disposed at the center in the vehicle body front-rear direction, which contributes to enhancement in the drivability. In addition, the arrangement of the battery 147 between the radiator 29 radiating heat and the fuel tank 28 prevents the heat coming from the radiator 29 from influencing the fuel tank 28.

Since the pump unit 97 contained and disposed in a lower portion of the fuel tank 28 is attached to the fuel tank 28 from the back side of the fuel tank 28, the pump unit 97 can be attached to the fuel tank 28 so that it will not be influenced by bumps present in the road surface.

Moreover, since the pump unit 97 is attached to the fuel tank 28 in the posture of having its rotational axis inclined forwardly and downwardly, a suction port of the pump unit 97 can be set as close as possible to a lower portion of the fuel tank 28. Thus, the dead residual amount of the fuel in the fuel tank 28 can be minimized.

In addition, the water supply port 107 for the reservoir tank 104 of the radiator 29 is disposed on the lower side of the first maintenance lid 117 detachably attached to the bottom wall of the luggage box 30 disposed on the lower side of the rider's seat 31. Therefore, by disposing the radiator 29 on the rear side of the fuel tank 28, it is easy to set the water supply port 107 of the reservoir tank 104 to front on a bottom portion of the rider's seat 31, thereby disposing the water supply port 107 to be higher than in the case of fronting on the step floor 159 directly above the reservoir tank 104 or the like. Thus, it is possible to provide better operability in supplying water.

Moreover, since the water supply port forming member 108 for forming the water supply port 107 is supported on the mount portion 54, for mounting to the vehicle body frame F side, of the tension rod 54 provided between the vehicle body frame F and the unit swing engine UE swingably supported on the vehicle body frame F, the need to apply a special contrivance for supporting the water supply forming member 108 can be eliminated. Thus, the water supply port forming member 108 can be supported by the vehicle body frame F.

Furthermore, the fuel from the fuel tank 28 is supplied to the fuel injection valve 74, and the fuel in the fuel tank 28 can be effectively supplied to the fuel injection valve 74 by use of the pump unit 97 biased by the fuel tank 28 having such a structure that the residual amount of height in the condition where the residual fuel amount is small is comparatively high.

The electric motor 42 for varying the speed change ratio of the continuously variable transmission M interposed between the engine E and the rear wheel WR is disposed on the lower side of the passenger step 162 provided at a rear portion of the step floor 159 of the vehicle body cover 34. The arrangement of the electric motor 42 at a comparatively low position contributes to the lowering of the center of gravity of the motorcycle.

In addition, since the continuously variable transmission M is of the belt type for constituting the unit swing engine UE together with the engine E in which the axis of the cylinder 45 is substantially horizontal and the electric motor 42 is disposed on the front side relative to the continuously variable transmission M and on a lateral side of the cylinder 45, the electric motor 42 can be protected by the cylinder 45 of the engine E and the continuously variable transmission M. Moreover, since the vehicle body frame F is provided with the support frame 41 for supporting the step floor 159 from the lower side and the electric motor 42 is disposed on the lower side relative to the support frame 41, the electric motor 42 can be more effectively protected by the support frame 41 which is high in rigidity.

The grab rail 118 is mounted to a rear portion of the vehicle body frame F, and the backrest 135 which is formed in a roughly streamline shape having at its upper surface the front inclined surface 135a inclined forwardly and downwardly in the side view and the rear inclined surface 135b inclined rearwardly and downwardly in the side view and which is mounted to the upper surface of a rear portion of the grab rail 118 is disposed on the rear side of the rear seat 33 possessed by the rider's seat 31.

Therefore, the waist portion of the passenger on the rear seat 33 can be securely held by the front inclined surface 135a inclined forwardly and downwardly, of the upper surface of the backrest 135, and the roughly streamline shape in the side view enhances the appearance quality of the backrest 135 and promises an enhanced aerodynamic performance. In addition, since the rear inclined surface 135b that is inclined rearwardly and downwardly of the upper surface of the backrest 135 can be utilized, luggage projecting rearwardly from the rear seat 33 can be mounted on the backrest 135.

In addition, since the backrest 135 is shaped to become gradually narrower in width towards the rear side in a top plan view, the backrest 135 can be made compact, the shape of the backrest 135 together with the shape of the vehicle body cover 34 provides a good harmony on a design basis, and dynamic performance can be more enhanced.

Further, since the upper surface of a rear portion of the grab rail 118 is set at substantially the same height as the upper surface of the rear seat 33 and the backrest 135 is detachably attached to the upper surface of the rear portion of the grab rail 118, when it is desired to mount more luggage on the rear seat 33 it is possible to mount the luggage by effectively utilizing the upper surface of the rear portion of the grab rail 118 after the backrest 135 is detached.

In addition, the oil supply lid 169 for closing the fuel tank 28 is disposed in the floor tunnel portion 167 of the vehicle body cover 34 and can be locked and is openably and closably attached to the floor tunnel portion 167 of the vehicle body cover 34 at a position corresponding to the fuel tank 28. In this case, the decorative cover 195 disposed at a position spaced from the oil supply lid 169 is openably and closably disposed on the inner cover 157 of the vehicle body cover 34, and the lock release operating member 272 for releasing the lock condition of the oil supply lid 169 is disposed on the inner cover 157 so as to be covered by the decorative cover 195 being in the closed condition. Therefore, the lock release operating member 272 is not be exposed as long as the decorative cover 195 is in the closed condition, whereby the possibility that the lock release operating member 272 might be trifled undesiredly can be minimized. Thus, the possibility of influences of disturbances such as weather on the lock release operating member 272 can be minimized.

In addition, since the inner cover 157 constitutes a part of the vehicle body cover 34 while covering the head pipe 27 from the rear side and the decorative cover 195 and the lock release operating member 272 are disposed on the inner cover 157, the operations on the lock release operating member 272 can be facilitated by disposing the lock release operating member 272 at a position on the front side of and close to the rider.

Further, since the decorative cover 195 is for covering the containing case 193 provided in the inner cover 157 from the vehicle body rear side and is not a member for exclusive use for covering the lock release operating member 272, the need for an exclusive-use member for covering the lock release operating member 272 can be eliminated. Thus, the number of component parts can be reduced. For example, when a wallet is put in the containing case 193, it is easy and convenient to pay the fuel charge at the time of supplying the fuel at a gas station, since the containing case 193 is opened whenever the oil supply lid 169 is opened.

Moreover, the containing case 193 is provided in the inner cover 157 so as to be capable of being slid in the vehicle body front-rear direction between the fully closed position where it is contained in the inner cover 157 and the fully opened position where it projects from the inner cover 157. The lock release operating member 272 is disposed on the inner cover 157 at a position set off from the containing case 193 and at least partly overlapped with the head pipe as viewed from the rear side in the vehicle body front-rear direction. Thus, the decorative case 195 is attached to the containing case 193 so as to cover the lock release operating member 272 in the condition where the containing case 193 is in the fully closed position. Therefore, it is possible to dispose the lock release operating member 272 at a good spatial efficiency while securing the capacity of the containing case 193 by making the containing case 193 of the drawer type.

In addition, since the left front containing portion 191 is provided with the case lock mechanism 208 for locking the containing case 193 in the fully closed position and it is necessary to release the lock condition of the containing case 193 in the fully closed position for opening the oil supply lid 169. Thus, the need for an exclusive-use lock mechanism for opening the oil supply lid 169 can be eliminated, and the locking structure can be simplified.

Still further, since the left and right front containing portions 191 and 192 are provided in the inner cover 157 at an interval therebetween along the vehicle body width direction and the lock release operating member 272 is disposed between the left and right front containing portions 191 and 192, the arrangement of the lock release operating member 272 in the space generated between the left and right front containing portions 191 and 192 permits the lock release operating member 272 to be disposed at a good spatial efficiency.

In addition, since the lock release operating member 272 is disposed at a position set off, for example to the left side, from the vehicle body center line C, the operations on the lock release operating member 272 can be facilitated by arranging the lock release operating member 272 at a position close to the left hand of the rider on the rider's seat 31. Moreover, the arrangement of the lock release operating member 272 as above is more effective, in relationship to the oil supply lid 169 covering the oil supply cap 168 which is used frequently.

Further, in the left front containing portion 191, the holding mechanism 230 for temporarily holding the containing case 193 at an intermediate position between the fully closed position and the fully opened position when the containing case 193 is openingly operated from the fully closed position is provided between the containing case and the inner cover 157. Therefore, the containing case 193 can be temporarily held at the intermediate position between the fully closed position and the fully opened position, and the containing case 193 can be used in correspondence with various use conditions.

Moreover, since the holding mechanism 230 is so configured that it can temporarily hold the containing case 193 at a roughly central position between the fully closed position and the fully opened position, things of appropriate sizes can be put into and taken out from the containing case 193 while holding the containing case 193 in the state of being opened to an appropriate extent.

Further, the containing case 193 is mounted to the inner cover 157 so as to be capable of being slid in the vehicle body front-rear direction between the fully closed position where it is contained in the inner cover 157 and the fully opened position where it projects from the inner cover 157. The hold release operating member 237 for releasing the hold condition of the holding mechanism 230 is disposed on the lower surface of the containing case 193 at a position near the vehicle body center line C side and the vehicle body rear side. Therefore, the hold release operating member 237 can be disposed at such a position so as to be easy to operate in releasing the condition where the containing case 193 is temporarily held by the holding mechanism 230.

In addition, the case lock mechanism 208 for locking the containing case 193 in the fully closed position according to a sliding operation of the containing case 193 towards the closing side to the fully closed position and for releasing the lock condition according to the action of an unlocking force is provided between the support frame 214 fixed to the inner cover 157 and the containing case 193. The containing case 193 present in the fully closed position is spring biased towards the opening side by the coil spring 212 and the spring means 222. Therefore, when an unlocking operation of the case lock mechanism 208 is effected by exerting an unlocking force, the containing case 193 is slid toward the opening side from the fully closed position by the spring biasing forces of the soil spring 212 and the spring means 222, and a part of the containing case 193 projecting from the inner cover 157. Thus, it is easy for the rider to visually confirm that the case lock mechanism 208 has been brought into the unlocked condition, and the containing case 193 can be drawn out with a small operating force.

Further, the first and second lock release operating buttons 248*a* and 249*a* for respectively releasing the lock conditions of the left front containing portion 191 and the luggage box 30 are disposed on the inner cover 157 on a lateral side of the left front containing portion 191. Thus, the plurality of lock release operating buttons 248*a*, 249*a* are concentratedly disposed on the lateral side of the left front containing portion 191. Therefore, the operation of releasing the lock conditions of the left front containing portion 191 and the luggage box 30 are facilitated.

In addition, since the first and second lock release operating buttons 248*a*, 249*a* are disposed at positions set off to the right side from the vehicle body center line C, the unlocking operations, the operations of releasing the lock conditions, by the rider on the rider's seat are further facilitated.

Moreover, since the first and second lock release operating buttons 248*a*, 249*a*, formed to be horizontally elongated, are arranged in a vertically aligned pattern, the plurality of lock release operating buttons 248*a*, 249*a* can be arranged in a compact fashion such that the spaces in the vertical direction occupied by the lock release operating buttons 248*a*, 249*a* will not be large.

Further, since the first lock release operating button 248*a* for releasing the lock condition of the left front containing portion 191, the case lock mechanism 208 possessed by the left front containing portion 191, and the first electric actuator 221 for exerting an unlocking force to the case lock mechanism 208 are disposed at substantially the same height, the wiring between the lock release operating button 248*a* for releasing the lock condition of the left front containing portion 191 and the first electric actuator 221 as well as the power transmission system between the first electric actuator 221 and the case lock mechanism 208 can be configured in a compact form.

While one embodiment of the present invention has been described above, the present invention is not limited to the above-described embodiment, and various design modifications are possible without departure from the scope of the present invention as defined in the claims.

For example, an embodiment of the present invention relating to the oil supply lid 169 has been described in the above. However, the present invention is also applicable in relation to the lid for covering the luggage box 30 on the lower side of the rider's seat 31, and is also applicable to a lid for maintenance of the vehicle body inside structure. Further, the lock release operating member 272 is not limited to an operating member for mechanically releasing the closed lock condition of a lid, but may be one for operating an electric actuator for releasing the lock condition, or may be one provided with an insertion hole for a key for releasing a lid lock mechanism. In addition, the present invention is also applicable to various vehicles such as motorcycle-type motorcycles, motor tricycles, buggy cars, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lock release operator layout structure in a vehicle comprising:
    containing portions including a front containing portion provided in an inner cover for covering from a rear side of a head pipe of a vehicle body frame at a front end and constituting a part of a vehicle body cover, each of said containing portions being adapted to be individually locked in a fully closed condition; and
    a plurality of lock release operators for releasing the locked condition of said containing portions, said plurality of lock release operators being disposed at said inner cover on a lateral side of said front containing portion.

2. The lock release operator layout structure in a vehicle as set forth in claim 1, wherein each of said plurality of lock release operators is disposed at a position set off to either the left or right side by an equal distance from the vehicle body center line.

3. The lock release operator layout structure in a vehicle as set forth in claim 1, wherein each of said plurality of said lock release operators is formed to be horizontally elongated, the plurality being arranged in a vertically aligned pattern.

4. The lock release operator layout structure in a vehicle as set forth in claim 2, wherein each of said plurality of said lock release operators is formed to be horizontally elongated, the plurality being arranged in a vertically aligned pattern.

5. The lock release operator layout structure in a vehicle as set forth in claim 1, wherein one of the plurality of lock release operators is for releasing the lock condition of said front containing portion, and
    wherein the lock release operator for releasing said front containing portion, a case lock mechanism of said front containing portion, and an electric actuator for exerting an unlocking force on said case lock mechanism are disposed at substantially the same height.

6. The lock release operator layout structure in a vehicle as set forth in claim 2, wherein one of the plurality of lock release operators is for releasing the lock condition of said front containing portion, and
    wherein the lock release operator for releasing said front containing portion, a case lock mechanism of said front containing portion, and an electric actuator for exerting an unlocking force on said case lock mechanism are disposed at substantially the same height.

7. The lock release operator layout structure in a vehicle as set forth in claim 3, wherein one of the plurality of lock release operators is for releasing the lock condition of said front containing portion, and
    wherein the lock release operator for releasing said front containing portion, a case lock mechanism of said front containing portion, and an electric actuator for exerting an unlocking force on said case lock mechanism are disposed at substantially the same height.

8. The lock release operator layout structure in a vehicle as set forth in claim 1, said plurality of lock release operators being arranged in a vertically aligned pattern.

9. The lock release operator layout structure in a vehicle as set forth in claim 2, said plurality of lock release operators being arranged in a vertically aligned pattern.

10. The lock release operator layout structure in a vehicle as set forth in claim 1, and further including a case lock mechanism having a pin-like striker attached to a lower surface of a case main body and a catcher turnably supported on the inner cover for catching the striker in accordance with a sliding of a containing case towards a closed position.

11. The lock release operator layout structure in a vehicle as set forth in claim 10, and further including an engaging member for engaging the catcher for holding the catcher in a state of catching the striker and a coil spring for biasing the engaging member in a direction for engagement with the catcher.

12. A containing structure for a vehicle, comprising:
    an inner cover for covering a rear side of a head pipe of a vehicle body frame at a front end and for constituting a part of a vehicle body cover; and
    a containing case mounted to said inner cover in an openable and closable condition;
    wherein a holding mechanism for temporarily holding said containing case at an intermediate position between a fully closed position and a fully opened position of said containing case when said containing case is opened from said fully closed position is provided between said containing case and said inner cover so that its hold condition can be released,
    wherein the holding mechanism is off set laterally with respect to a longitudinal center line of the containing case, and
    wherein a holding release operating member for releasing said hold condition of said holding mechanism is off set at the same side as the holding mechanism,
    the holding release operating member being disposed at a lower surface of said containing case at a position near a vehicle body rear side.

13. The containing structure for a vehicle as set forth in claim 12, wherein said holding mechanism is capable of temporarily holding said containing case at a roughly central position between said fully closed position and said fully opened position.

14. The containing structure for a vehicle as set forth in claim 12, wherein said containing case is mounted to said inner cover so as to be slidable in the vehicle front-rear direction between said frilly closed position where said containing case is contained in said inner cover and said fully opened position where said containing case projects from said inner cover, and a hold release operating member for releasing said hold condition of said holding mechanism is disposed at a lower surface of said containing case at a position near a vehicle body center line side and a vehicle body rear side.

15. The containing structure for a vehicle as set forth in claim 13, wherein said containing case is mounted to said inner cover so as to be slidable in the vehicle front-rear direction between said fully closed position where said containing case is contained in said inner cover and said fully opened position where said containing case projects from said inner cover, and a hold release operating member for releasing said hold condition of said holding mechanism is disposed at a lower surface of said containing case at a position near a vehicle body center line side and a vehicle body rear side.

16. The containing structure for a vehicle as set forth in claim 14, wherein a case lock mechanism for locking said containing case in said fully closed position according to the sliding of said containing case toward the closing side to said fully closed position and for releasing the lock condition according to the action of an unlocking force is provided between a support frame fixed to said inner cover and said containing case, and spring means for spring biasing said containing case in said fully closed position toward the opening side.

17. The containing structure for a vehicle as set forth in claim 15, wherein a case lock mechanism for locking said containing case in said fully closed position according to the sliding of said containing case toward the closing side to said fully closed position and for releasing the lock condition according to the action of an unlocking force is provided between a support frame fixed to said inner cover and said containing case, and spring means for spring biasing said containing case in said fully closed position toward the opening side.

18. The containing structure for a vehicle as set forth in claim 12, further comprising:
   a lock for selectively locking said containing case; and
   a lock release operator for releasing a locked condition of said containing case,
   said containing case and said lock release operator being disposed on opposite sides of a longitudinal centerline of the vehicle.

19. A lock release operator layout structure in a vehicle comprising:
   containing portions including a front containing portion provided in an inner cover for covering from a rear side of a head pipe of a vehicle body frame at a front end and constituting a part of a vehicle body cover, each of said containing portions being adapted to be individually locked in a fully closed position; and
   a plurality of lock release operators for releasing the locked condition of said containing portions, said plurality of lock release operators being disposed at said inner cover on a lateral side of said front containing portion,
   wherein one of said plurality of lock release operators is for releasing the lock condition of said front containing portion, and
   wherein the lock release operator for releasing said front containing portion, a case lock mechanism of said front containing portion, and an electric actuator for exerting an unlocking force on said case lock mechanism are disposed at substantially the same height.

20. The lock release operator layout structure in a vehicle as set forth in claim 19, wherein each of said plurality of lock release operators is disposed at a position set off to either the left or right side by an equal distance with respect to the vehicle body center line.

21. The lock release operator layout structure in a vehicle as set forth in claim 1, wherein said plurality of lock release operators consists of two lock release operators.

* * * * *